US011451643B2

(12) United States Patent
Magerramov et al.

(10) Patent No.: US 11,451,643 B2
(45) Date of Patent: Sep. 20, 2022

(54) MANAGED TRAFFIC PROCESSING FOR APPLICATIONS WITH MULTIPLE CONSTITUENT SERVICES

(71) Applicant: Amazon Technologies, Inc., Seattle, WA (US)

(72) Inventors: Joseph Elmar Magerramov, Bellevue, WA (US); Shubha Shree Bheemarao, Seattle, WA (US); Kiran K Meduri, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/835,037

(22) Filed: Mar. 30, 2020

(65) Prior Publication Data

US 2021/0306436 A1   Sep. 30, 2021

(51) Int. Cl.
*G06F 15/16* (2006.01)
*H04L 67/56* (2022.01)
*G06F 9/455* (2018.01)
*H04L 9/40* (2022.01)
*H04L 67/10* (2022.01)

(52) U.S. Cl.
CPC .......... *H04L 67/56* (2022.05); *G06F 9/45558* (2013.01); *H04L 63/0428* (2013.01); *H04L 67/10* (2013.01); *G06F 2009/45595* (2013.01)

(58) Field of Classification Search
CPC ..... H04L 67/10; H04L 63/0428; H04L 67/28; H04L 63/04; H04L 41/5003; H04L 47/2408; H04L 67/327; G06F 2009/45595; G06F 9/45558
USPC ....................................................... 709/202
See application file for complete search history.

(56) References Cited

U.S. PATENT DOCUMENTS

| 7,310,684 | B2 | 12/2007 | Patrick et al. | |
| 7,801,976 | B2 | 9/2010 | Hodges et al. | |
| 8,639,935 | B2 * | 1/2014 | Raleigh | H04W 48/16 |
| | | | | 713/168 |
| 9,729,416 | B1 * | 8/2017 | Khanal | H04L 41/065 |

(Continued)

FOREIGN PATENT DOCUMENTS

| WO | WO-0191397 A2 * | 11/2001 | ............ H04L 29/06 |
| WO | 2018005850 A1 | 1/2018 | |
| WO | WO-2020088529 A1 * | 5/2020 | ......... H04L 43/0852 |

OTHER PUBLICATIONS

A Distributed Assignment Method for Dynamic Traffic Assignment Using Heterogeneous-Adviser Based Multi-Agent Reinforcement Learning Zhaotian Pan;Zhaowei Qu;Yongheng Chen;Haitao Li;Xin Wang (Year: 2020).*

(Continued)

*Primary Examiner* — Oscar A Louie
*Assistant Examiner* — Oluwatosin M Gidado
(74) *Attorney, Agent, or Firm* — Robert C. Kowert; Kowert, Hood, Munyon, Rankin & Goetzel, P.C.

(57) ABSTRACT

A determination is made that messages from a first constituent service of an application are to be processed at a second constituent service. Networking configuration settings are generated such that a message originating at the first constituent service is directed to a traffic processing agent established by a traffic management service. In response to a receipt of a message from the first constituent service at the agent, one or more packets are delivered to the second constituent service.

20 Claims, 11 Drawing Sheets

(56) References Cited

U.S. PATENT DOCUMENTS

| | | | |
|---|---|---|---|
| 9,842,045 B2 | 12/2017 | Heorhiadi et al. | |
| 10,230,571 B2 | 3/2019 | Rangasamy et al. | |
| 2011/0110377 A1* | 5/2011 | Alkhatib | H04L 61/2507 370/395.53 |
| 2011/0307600 A1* | 12/2011 | Polley | H04L 41/12 709/224 |
| 2011/0314145 A1* | 12/2011 | Raleigh | H04L 43/0882 709/224 |
| 2014/0189686 A1 | 7/2014 | Masters et al. | |
| 2014/0337613 A1* | 11/2014 | Martini | H04L 63/1441 713/151 |
| 2017/0046146 A1 | 2/2017 | Jamjoom et al. | |
| 2017/0242784 A1 | 8/2017 | Heorhiadi et al. | |
| 2018/0091392 A1 | 3/2018 | Richards et al. | |
| 2018/0113707 A1 | 4/2018 | Mora Lopez et al. | |
| 2018/0121261 A1* | 5/2018 | Nadig | G06F 9/541 |
| 2019/0392150 A1 | 12/2019 | Shevade et al. | |
| 2020/0366756 A1* | 11/2020 | Vittal | H04L 67/36 |
| 2020/0412635 A1* | 12/2020 | Jha | H04L 45/121 |

OTHER PUBLICATIONS

Traffic quality monitoring system between different network providers Hyun Jong Kim;Seong Gon Choi 2010 The 12th International Conference on Advanced Communication Technology (ICACT) (Year: 2010).*

Content-aware Internet application traffic measurement and analysis T.S. Choi;C.H. Kim;S. Yoon;J.S. Park;B.J. Lee;H.H. Kim;H.S. Chung;T.S. Jeong 2004 IEEE/IFIP Network Operations and Management Symposium (IEEE Cat. No. 04CH37507) Year: 2004 | vol. 1 | Conference Paper | Publisher: IEEE (Year: 2004).*

The Path Computation Element for the Network Service and Business Plane Computation of route offers and price modelling for inter-carrier services G. Carrozzo;N. Ciulli;P. Donadio;A. Cimmino 2012 17th European Conference on Networks and Optical Communications (Year: 2012).*

Efficient Level of Service Classification for Traffic Monitoring in the Compressed Video Domain Roland Tusch;Felix Pletzer;Armin Krätschmer;Laszlo Böszörmenyi; Bernhard Rinner;Thomas Mariacher; Manfred Harrer 2012 IEEE International Conference on Multimedia and Expo Year: 2012 | (Year: 2012).*

AWS, "AWS App Mesh User Guide", Updated Jan. 17, 2020, pp. 1-84.

Christian Posta, "Microservices Patterns With Envoy Proxy, Part II: Timeouts and Retries", Retrieved from https://blog.christianposta.com/microservices/02-microservices-patterns-with-envoy-proxy-part-ii-timeouts-and-retries/ on Feb. 27, 2020, pp. 1-14.

Christian Posta, "Microservices Patterns with Envoy Proxy, Part III: Distributed Tracing", Retrieved from https://blog.christianposta.com/microservices/03-microservices-patterns-with-envoy-proxy-part-iii-distributed-tracing/ on Feb. 27, 2020, pp. 1-11.

Christian Posta, "Microservices Patterns with Envoy Sidecar Proxy, Part I: Circuit Breaking", Retrieved from https://blog.christianposta.com/microservices/01-microservices-patterns-with-envoy-proxy-part-i-circuit-breaking/ on Feb. 27, 2020, pp. 1-14.

International Search Report and Written Opinion dated Jun. 7, 2021 in Application No. PCT/US2021/022546, Amazon Technologies, Inc., pp. 1-11.

* cited by examiner

MANAGED TRAFFIC PROCESSING FOR APPLICATIONS WITH MULTIPLE CONSTITUENT SERVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more compute instances (such as "guest" virtual machines) hosted by the single virtualization host. Each such compute instance may represent a software simulation acting as a distinct logical computing system that provides users with the illusion that they are the sole operators of a given hardware computing resource, while also providing application isolation and security among the various virtual machines. Instantiating several different compute instances on the same host may also help increase the overall hardware utilization levels at a data center, leading to higher returns on investment.

Some complex applications implemented using networked resources are designed as collections of interacting constituent services, e.g., to enable a cleaner separation of functions and responsibilities within the applications. Each constituent service may, for example, be assigned a respective DNS (Domain Name System) name which can be used to direct messages to the constituent service from the other constituent services of the same application via protocols such as HTTP (HyperText Transfer Protocol). When a client of the application submits a request, internal messages may be transmitted among the constituent services to perform the requested work.

Figure 1:
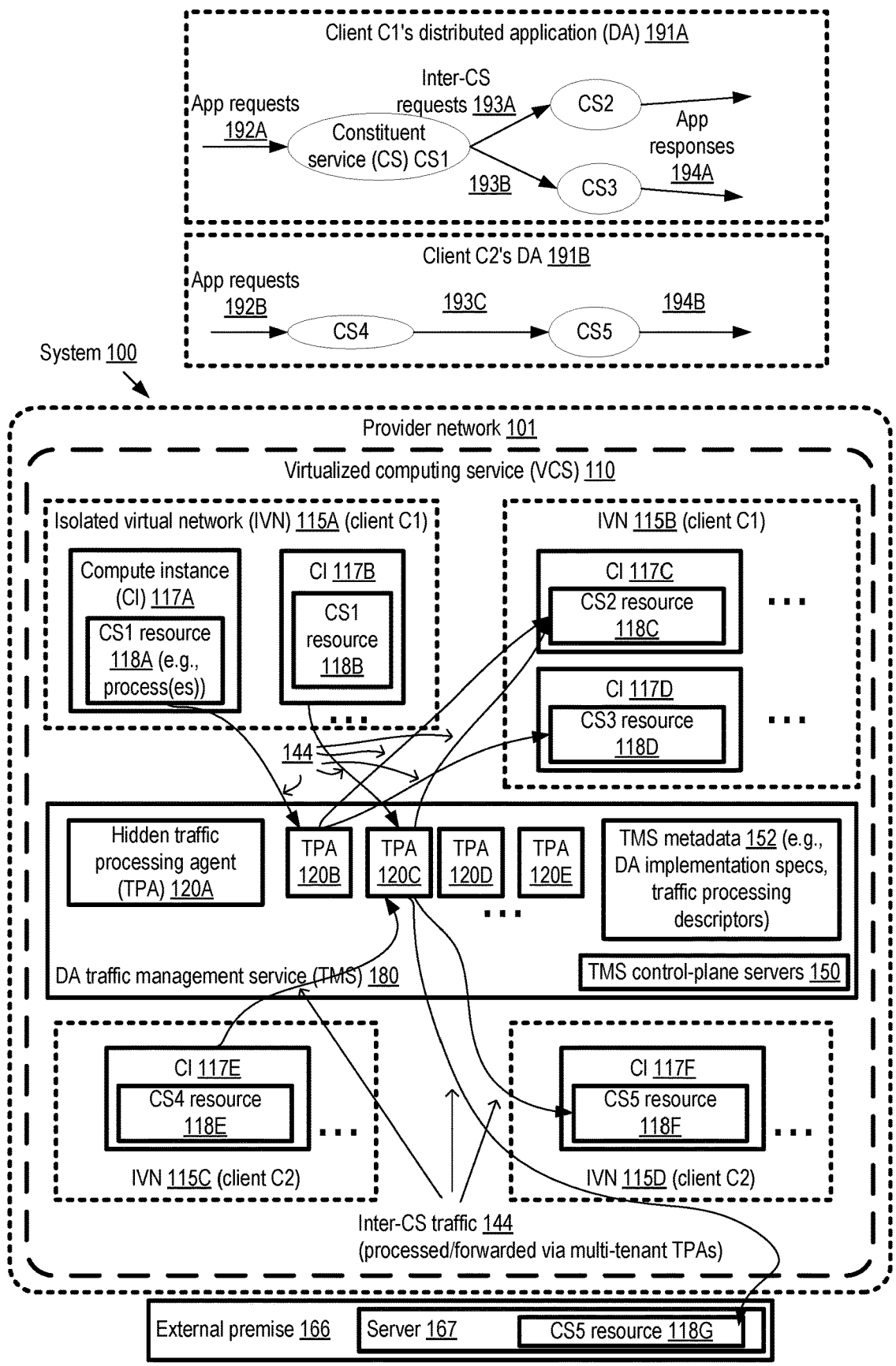
FIG. 1 illustrates an example system environment in which a fleet of hidden agents may be used to perform traffic processing tasks such as load balancing and request tracing for network traffic flowing between constituent services of a distributed application, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for configuring and utilizing fleets of "hidden" agents for performing various types of traffic processing tasks with respect to network packets flowing between constituent services of distributed applications, where such hidden agents can be used by application owners who have explicitly opted in to the use of an intermediary service for traffic processing on their behalf, without requiring the application owners to perform low-level configuration operations with regard to the agents. The distributed applications implement a service-oriented architecture internally, with different subsets of a given application's overall functionality being executed at respective lower-level self-contained services referred to as constituent services of the application. The distributed application itself may be exposed to its clients or users as a network-accessible service in some cases, with a DNS name assigned to the service and used by clients to submit application requests. Service-oriented architectures may be employed for a variety of reasons—e.g., to enable different design and development teams to focus independently on discrete units of functionality (each implemented as a separate constituent service) which may require different skill sets than other units, to help achieve faster rollouts of updates, and so on. The constituent services may also be referred to as micro-services/microservices, internal services, or sub-services. Each constituent service may be implemented using a respective set of resources such as a collection of virtual or physical machines, and may be assigned a respective internal service name (not exposed to clients of the application) to facilitate inter-constituent-service communications.

When owners of distributed applications use such service-oriented architectures, they are typically faced with a number of cross-cutting concerns. At a minimum, they need to address service discovery, liveness and load-balancing: each constituent service needs to know how to reach its downstream dependencies, which of the nodes of various constituent services are healthy, and how to fairly distribute requests across those nodes. Increasingly, concerns like request tracing, location-based affinity, authentication and authorization, load shedding, backpressure, and support for blue/green deployments are also becoming important. Depending on the dimension they want to optimize, application owners traditionally choose one of two approaches. In one such traditional approach, application owners set up respective load balancers for each constituent service, and send all service-to-service requests via such load balancers. In this approach, cross-cutting concerns of the kind mentioned above have to be implemented by the load balancers. Since load balancers have limited knowledge about upstream clients, not every cross-cutting concern can be supported in this approach. In an alternative approach, known as "service mesh," a piece of software (called a sidecar proxy) may be set up by application owners alongside every instance of their service. Incoming and outgoing service-to-service requests among constituent services may be routed through such proxies, and the proxies may help to implement the cross-cutting concerns. Such proxies form a "mesh" that is aware of how to route requests between individual constituent services, what tracing or monitoring features should be turned on, and so on. This second approach is more flexible than the load balancer based approach mentioned above, but has the disadvantage that it requires application owners to configure, maintain and deploy extra software, and the proxy consumes resources at every service node. Furthermore, service meshes can add extra friction when services that make up the mesh span multiple networks, putting the burden on the application owners to set up network connectivity. The proposed technique uses hidden agents to alleviate at least some of the disadvantages of both these traditional approaches.

In some cases, at least a subset of the constituent services of a given distributed application may utilize resources of a provider network or public cloud computing environment. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. Constituent services of a distributed application may be implemented using respective isolated networks in some cases (such as isolated virtual networks of a virtualized computing service of a provider network, or networks of resources located at premises of a client of a provider network). An isolated virtual network (IVN) of a provider network may comprise a collection of networked resources (including, for example, compute instances) assigned or allocated to a given client, which are logically isolated from (and by default, inaccessible from) resources allocated in other IVNs. Respective isolated networks may be used for constituent services, for example, so that it becomes easier to orchestrate the deployment and configuration of the different constituent services independently of one another.

Clients of a distributed application may not be aware of the internal organization of the application, and may not be provided information regarding the constituent services of the application. To the clients, the application may comprise the equivalent of a black box to which requests for application functions can be sent, and from which corresponding responses may be received. In order to fulfill a given request from a client, some constituent services may, however, have to communicate with one another. For example, one constituent service CS1 may receive client requests, examine the contents of the requests, and then send corresponding internal requests based on the request type to other constituent services CS1 or CS2, those services CS2/CS3 may in turn send additional internal requests to other constituent services, one or more other constituent services may eventually collect and format the data which is to be provided to the clients as a response, and so on. Just as the distributed application as a whole may appear to be a black box to its clients, a given constituent service of the distributed application may also constitute a black box to other constituent services of the distributed application. In order to enable messages to flow between the constituent services, a non-trivial amount of networking configuration may have to be performed in some cases as indicated above, especially if the constituent services are implemented at respective isolated networks. For example, route table entries may have to be configured, gateways may have to be set up, and so on, because internal network addresses used for the resources within a given isolated network may not be advertised or visible outside the isolated network (and in some cases may even overlap with internal network addresses used in other isolated networks being used for the same application).

In addition to the baseline requirement for routing messages between constituent services, designers or owners of distributed applications may also desire a number of other types of processing tasks to be performed with respect to traffic flowing between constituent services (e.g., some of the cross-cutting concerns listed above). For example, requests submitted from one constituent service CS1 to another constituent service CS2 may have to be load-balanced, such that the workload of CS2 is distributed reasonably evenly across the resources implementing CS2. Some application owners may wish to collect timestamped trace records of all the internal inter-constituent-service messages generated in response to a given client request, and so on. Such trace records may, for example, be helpful for debugging, auditing, performance analysis and/or other purposes.

In order to facilitate these types of traffic processing tasks as well as inter-constituent-service message routing, a traffic management service (TMS) for distributed applications may utilize a fleet of hidden traffic processing agents (TPAs) in some embodiments. The TPAs may be considered "hidden" in that the clients of the TMS (such as distributed application owners or designers) may not be provided any details of, or have to perform low-level configuration operations for, the TPAs in at least some embodiments. The clients of the TMS may simply opt-in to the use of the TMS as an intermediary for traffic between constituent services and provide descriptors of the constituent services in some embodiments, indicating DNS names assigned to the respective constituent services, the names and network addresses of resources used to implement the constituent services, desired connectivity between the constituent services, and the desired types of processing tasks (load balancing, tracing etc.) with respect to inter-constituent-service traffic. The TMS may establish and/or assign pre-established TPAs to perform the inter-constituent-service traffic processing, and perform the required low-level networking configuration operations which allow traffic to flow between the constituent services as desired by the client. When a resource R1 (e.g., a process running at a compute instance) implementing a particular constituent service CS1 of an application attempts to open a network connection to another constituent service CS2, the connection may be proxied via a TPA in various embodiments. The TPA, acting as an intermediary between R1 and one or more resources (e.g., R2, R3, etc.) of CS2, may route individual requests from R1 to one of the CS2 resources, regardless of whether CS2 is run at a different isolated network than CS1, and regardless of the particular technology stack (e.g., hardware devices, virtualization management software, operating system, or application-level software) being used at the CS2 resource in at least some embodiments.

In addition to eliminating the burden of performing low-level networking configuration operations from TMS clients, the TMS may also help reduce the set of resources that have to be allocated by TMS clients in various embodiments. For example, instead of having to set up numerous "sidecar proxies" to perform traffic processing tasks such as load balancing and request tracing, TMS clients may simply rely on the TMS to provision, configure and allocate the appropriate set of TPAs, manage the health and responsiveness of the TPAs, and so on. At least a subset of TPAs of the TMS may be configured in multi-tenant mode in some embodiments, enabling sharing of traffic processing resources among applications of different clients.

As one skilled in the art will appreciate in light of this disclosure, certain embodiments may be capable of achieving various advantages, including some or all of the following: (a) reducing the overall amount of computing, memory and other resources which have to be allocated by owners of distributed applications, by in effect offloading traffic forwarding and processing tasks to TMS agents, (b) reducing the amount of errors and/or failures which may be encountered at distributed applications, e.g., by ensuring that the appropriate set of intermediary resources are configured correctly for traffic to flow as intended between constituent services of the distributed applications, (c) improving the user experience of distributed application administrators, e.g., by eliminating the need for such administrators to perform low-level networking configuration operations for inter-constituent-service traffic, and/or (d) improving the security of distributed applications, e.g., by providing tight integrations with access management services and other security-related services via hidden traffic processing agents.

According to some embodiments, a system may comprise one or more computing devices, e.g., of a TMS implemented at a provider network for distributed applications of clients of the provider network. The computing devices may include instructions that upon execution on or across one or more processors cause the computing devices to obtain, via one or more programmatic interfaces, an indication from a client of the TMS that a first constituent service of a distributed application is implemented at least in part using a first resource at a first isolated network, while a second constituent service of the distributed application is implemented at least in part using a second resource at a second isolated network. An indication that the client has explicitly opted in for the use of the TMS for managing traffic between the constituent services of the distributed application may also be received in various embodiments. The computing devices may also obtain a connectivity descriptor of the distributed application in various embodiments, indicating that at least some requests originating at the first constituent service are to be processed at the second constituent service. Indications of the specific formats (e.g., HTTP) or schemas used for inter-constituent-service messages may also be obtained at the TMS from the client in some embodiments. In at least some embodiments, a traffic processing descriptor of the distributed application may also be obtained at the computing devices, indicating one or more tasks to be performed with respect to the requests (such as a tracing task, a load balancing task, and so on). Note that in some implementations, connectivity descriptors may include traffic processing descriptors and/or message format information.

The computing devices may identify at least one hidden multi-tenant traffic processing agent (TPA) of a fleet of hidden TPAs of the TMS to be used as an intermediary for network traffic between the first and second constituent services in various embodiments. The TMS may cause one or more networking configuration settings associated with the first resource to be set such that a request generated at the first resource and targeted at the second constituent service is instead directed to the TPA set up as the intermediary. Indications of the TPA and/or the networking configuration settings may not be provided to the client in at least some embodiments.

In response to receiving a particular request (an internal request, generated as part of the workflow for fulfilling a higher-level request from a user of the distributed application) originating at the first resource, the TPA may perform a set of operations which were indicated in the traffic processing descriptor in various embodiments. The request may be parsed into its elements (e.g., headers versus body) in accordance with the message format or protocol being used. In a scenario in which a tracing task was indicated in the traffic processing descriptor, for example, one or more trace messages may be stored, indicating the time at which the particular internal request was generated, an identifier of an application client request for which the particular internal request was generated (which may be indicated by a header value), and so on. In addition to performing such processing tasks as per the processing descriptor, the TPA may cause one or more packets corresponding to the particular request (e.g., comprising the contents of the particular packet, or transformed versions of such contents, depending on the packet processing descriptor) to be delivered to the second resource which implements the second constituent service in various embodiments. Such packets may be delivered without requiring the client of the TMS to configure a network route between the isolated networks at which the respective constituent services are implemented, or to perform other low-level networking configuration tasks such as establishing gateways or the like. In order to eliminate the burden of routing and other low-level networking configuration tasks from the client, the TMS may access various types of networking metadata of the isolated networks (e.g., virtual-to-physical address mappings) and perform the required networking configuration tasks itself in various embodiments. In some implementations, a number of network endpoints may be configured to receive traffic directed to the various constituent services of a distributed application, and internal-use DNS records associating domain names of the constituent services with the endpoints may be created and stored as part of the low-level configuration operations performed by the TMS.

A wide variety of traffic processing tasks may be performed with the help of the TPAs of a TMS in different embodiments. Such tasks may include, among others: load balancing-related tasks, authorization-related tasks, authentication-related tasks, affinity-based destination selection tasks, logging/tracing tasks as mentioned earlier, load shedding-related tasks, health state evaluation tasks, or back pressure-related tasks.

In some embodiments, the TMS may configure one or more fleets of TPAs in advance, and allocate subsets of the fleet to applications of TMS clients as needed, in either multi-tenant or single-tenant mode depending on the preferences of the clients. For example, respective groups of TPAs may be configured within various data centers of a provider network. In at least one embodiment, the TMS may also or instead instantiate TPAs on demand.

Individual TPAs may be implemented using a variety of techniques in different embodiments. In some cases, respective compute instances running at virtualization hosts of a virtualized computing service may be used as TPAs. A virtualized computing service can be referred to as an elastic compute service, virtual machine service, computing cloud service, compute engine, or cloud compute service, in various implementations. In one embodiment, a virtualization management offloading card, connected to the primary CPUs of a virtualization host via a peripheral interconnect such as PCIe (Peripheral Component Interconnect-Express) or USB (Universal Serial Bus), may be used to implement at least some of the functionality of a TPA. Non-virtualized servers may be used for TPAs in other embodiments. In one embodiment, virtualization management software components (e.g., hypervisors, privileged operating systems used to manage some aspects of virtualization management, etc.) run at least in part at the primary processors or CPUs of a virtualization host may be used to implement at least some TPA functions.

The TMS may deploy its TPAs to connect a variety of different types of constituent service resources in some embodiments. For example, a resource implementing a constituent service may comprise, among others, (a) a compute instance of a virtualized computing service of a provider network, (b) a resource of a software-container-based computing service of a provider network, (c) a resource of a dynamically-provisioned event-driven computing service of a provider network (e.g., a service implementing a functional programming model, in which clients submit indications of functions to be performed, and the specific resources to be used are selected at the event-driven computing service without allocating the resources in advance), (d) an auto-scaling group of compute resources of a provider network, (e) a target destination of a load balancing service of a provider network, or (f) a computing device located at a premise of a client of a provider network.

Example System Environment

FIG. 1 illustrates an example system environment in which a fleet of hidden agents may be used to perform traffic processing tasks such as load balancing and request tracing for network traffic flowing between constituent services of a distributed application, according to at least some embodiments. In the depicted embodiment, traffic associated with the respective sets of constituent services of at least two distributed applications (DAs) with service oriented architectures 191A and 191A may be managed with the help of a DA traffic management service (TMS) 180 implemented at least in part at a provider network 101.

DA 191A may comprise at least three constituent services CS1, CS2 and CS3, while DA 191B may comprise at least two constituent services CS4 and CS5. Application requests 192A submitted by clients of DA 191A may be processed first at CS1; then CS1 may send internal requests 193A or 193B to CS2 and/or CS3, which may generate application responses 194A for the clients of DA 191A. In the case of DA 192B, application requests 192B may be processed first at CS4; then, CS4 may send internal requests to CS5 to complete the tasks requested by the clients, and application responses 194B may be generated at CS5. Example DAs with just a few constituent services each are shown in FIG. 1 to simplify the presentation; in practice, a given DA may comprise tens or even hundreds of services in some embodiments, with complex graphs indicating internal message flows within the DA.

In the embodiment shown in FIG. 1, at least a subset of the functionality of the DAs 191A and 191B is performed using compute instances (CIs) 117 set up within isolated virtual networks (IVNs) 115 of a virtualized computing service (VCS) 110 of provider network 110. The resources of a provider network 110 may in some cases be distributed across multiple data centers, which in turn may be distributed among numerous geographical regions (e.g., with each region corresponding to one or more cities, states or countries). For example, a provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include a number of network-accessible services, such as a VCS 110, one or more storage services, database services and the like. A VCS may also be referred to as an elastic compute service, virtual machines service, computing cloud service, compute engine, and cloud compute, in various implementations.

As indicated earlier, an IVN 115 may comprise a collection of networked resources (including, for example, CIs 117) assigned or allocated to a given VCS client, which are logically isolated from (and by default, inaccessible from) resources allocated in other IVNs. The client on whose behalf an IVN 115 is established may be granted substantial flexibility regarding network configuration for the resources of the IVN 115—e.g., private IP addresses for CIs may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Furthermore, in at least some embodiments, custom network endpoints may be set up within IVNs 115 to enable CIs of the IVN 115 to communicate with other publicly-accessible services of the provider network (such as storage services, database services, machine learning services, etc.) using private network pathways of the provider network, without having to traverse or use links or devices of the public Internet. In various embodiments, the network addresses assigned to CIs 117 within an IVN 115 may differ from the underlying or "substrate" network addresses assigned to the hardware servers on which the CIs run. An encapsulation protocol and associated mapping service may be used to route the flows of network traffic within and across the IVNs 115 (e.g., from one CI 117 to another, between client devices external to the VCS 110 and the CIs 117, or between CIs 117 and other provider network services) over the links and servers of the underlying substrate network in various embodiments.

In the example scenario depicted in FIG. 1, constituent service CS1 of DA 191A of a client C1 of the provider network is implemented at least in part using resources (e.g., respective sets of processes) 118A running at CI 117A and 118B at CI 117B within IVN 115A (which is set up on behalf of client C1). The resources 118 may also be referred to as "implementation units" or "application units" of the constituent services or the DAs in some embodiments. Constituent service CS2 of DA1 may use at least resource 118C at CI 117C within IVN 115B (also set up on behalf of client C1), while constituent service CS 3 may be implemented at least in part using resource 118D at CI 117D within IVN 115B. Constituent service CS4 of DA 191B (established on behalf of client C2 of the provider network) may be implemented at least in part using resource 118E running at CI 117E of IVN 15C set up for client C1. Constituent service CS5 may be implemented using some resources within the provider network (such as resource 118F at CI 117F of IVN 115D) and some resources outside the provider network (e.g., resource 118G running at server 167 at external premise 166).

In order to facilitate routing of messages between the constituent services of a given DA 191, TMS 180 may be employed in the depicted embodiment. TMS 180 may comprise a set of control plane servers 150, metadata 152 and a data plane fleet of hidden traffic processing agents (TPAs) 120, such as TPAs 120A-120E. In various embodiments, the traffic and operations of the cloud provider network and its services (such as the TMS 180) may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers (such as servers 150 in the case of the TMS 180). Control plane traffic generally includes administrative operations, such as system configuration and management (e.g., resource placement, hardware capacity management, diagnostic monitoring, and/or system state information). The data plane includes customer resources that are implemented on the cloud provider network (e.g., computing instances, containers, block storage volumes, databases, and/or file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks in at least some embodiments. In the embodiment depicted in FIG. 1, the control plane servers 150 may, for example, perform tasks such as provisioning TPAs, monitoring the health of TPAs, replacing failed TPAs, etc.

A client of the provider network 101, such as C1 (on whose behalf DA 191A is executed) or C2 (on whose behalf DA 191B is executed) may provide various types of information and preferences to the TMS regarding their respective DAs' constituent services and the manner in which traffic between the constituent services is to be routed and processed in the depicted embodiment. For example, client C1 may provide an indication of the constituent service resource mappings (which resources are used for which constituent service) and connectivity (which constituent service is expected to send messages to, or receive messages from, which other constituent services) of DA 191A via programmatic interfaces of the TMS, and client C1 may similarly provide information about DA 191B. Application implementation specifications (containing elements similar to those shown in FIG. 2) may be provided to the TMS control plane servers 150 in some embodiments, indicating a list of the different constituent services of a DA, connectivity descriptors (indicating the directions of flow of messages expected between the constituent services), service DNS names, arrays of records indicating the identifiers (e.g., network addresses) and types (e.g., compute instances versus non-virtualized servers) of resources being used for the constituent services, and so on. In addition, in at least some embodiments, traffic processing descriptors indicating the specific types of tasks to be performed with respect to the network messages sent from one constituent service to another may be provided to the TMS 180 by clients. For example, client C1 may wish to log or trace all the internal requests sent from CS1 to CS2 or CS3, client C2 may wish to enforce specified rules to determine whether a given request from CS4 (e.g., from resource 118E) is to be routed to a CS5 resource within the provider network (e.g., resource 118F) or to a CS5 resource located outside the provider network (e.g., resource 118G), and so on.

The information provided by a client about the distributed application (such as the implementation specification) and the types of operations to be performed for traffic between constituent services (such as the traffic processing descriptors) may be stored as part of metadata 152 by the TMS control plane servers 150 in the depicted embodiment. Based at least in part on the metadata, the TMS control plane servers 150 may identify one or more TPAs for each constituent service of the different DAs 191 in various embodiments. For example, TPA 120B may be designated for use as an intermediary for outbound traffic from CS1 resource 118A towards CS2, while TPA 120C may be designated for use as an intermediary for outbound traffic of CS1 resource 120C. In some embodiments, at least a subset of the TPAs 120 may be configured in multi-tenant mode, and as a result, they may be deployed to process inter-constituent-service traffic for a plurality of clients or DAs. In the depicted embodiment, for example, TPA 120C, which is designated for processing DA 191A traffic originating at CS1 resource 118B, may also be concurrently assigned to process DA 191B traffic originating at CS4 resource 118E.

When a message comprising one or more packets is received at a TPA such as 120B or 120C from a resource of a constituent service such as CS1 or CS4, as a result of configuration settings generated by the TMS control plane, which cause the message to be diverted to the TPA configured as the intermediary between constituent services, the receiving TPA 120 may perform several types of tasks in some embodiments. The receiving TPA may look up (e.g., in a local cache) the kinds of processing operations to be performed with respect to the message, based on the traffic processing descriptor(s) applicable to the message, and implement those processing operations in various embodiments. For example, a trace or log record may be generated by the TPA to indicate the receipt of the message, and stored at a persistent store indicated by the client in the traffic processing descriptor. In another example, the TPA may implement a load-balancing policy indicated in the traffic processing descriptor, or an affinity-based destination selection policy indicated in the traffic processing descriptor, to select a particular destination for the contents of the message. In some cases, the message may be transformed—e.g., it may be decrypted at the TPA, or it may be translated from one schema to another.

The receiving TPA may cause one or more packets corresponding to at least some received messages to be delivered to one or more destinations indicated in the application metadata in various embodiments. e.g., using routes set up automatically by the TMS control plane servers 150. For example, TPA 120B may cause at least some contents of a message received from CS1 resource 118A within IVN 115A to be delivered to CS2 resources 118C or CS3 resource 118D in IVN 115B in the depicted example scenario, which involved sending traffic across IVN boundaries. TPA 120C may cause contents of messages received from resource 118B to CS2 resource 118D, also crossing IVN boundaries. TPA 120C may also be responsible for sending contents of some messages from CS4 resource 117A to CS5 resource 118F (crossing another IVN-to-IVN boundary), and contents of other messages from CS4 resource to CS5 resource 118G (crossing a boundary between the provider network and the external premise 166). In order to transmit traffic across IVN-to-IVN boundaries, or to send traffic from provider network data centers to external premises, non-trivial networking configuration operations may be required in various embodiments (networking configuration settings of resources within an IVN are, by default, not publicized outside the IVN as indicated earlier). In embodiments in which a TMS 180 is utilized, the client on whose behalf the traffic is sent across may not have to perform such configuration operations, and may not even be informed regarding the existence or use of specific TPAs on the client's behalf. Instead, the TMS (e.g., its control plane servers 150) may obtain access to various types of VCS configuration settings, including the virtual-to-physical resource mappings of the IVNs, and use the settings to configure appropriate routes for inter-constituent-service traffic 144. Note that in at least some embodiments, at least some information about the networking configuration of external premises 166 (such as the IP addresses of servers 167 at the external premises, and the mappings between constituent service resources such as 118G and the servers 167) may have to be provided to the TMS to enable it to route packets to external resources such as 118G correctly.

Example Distributed Application Specification

Figure 2:
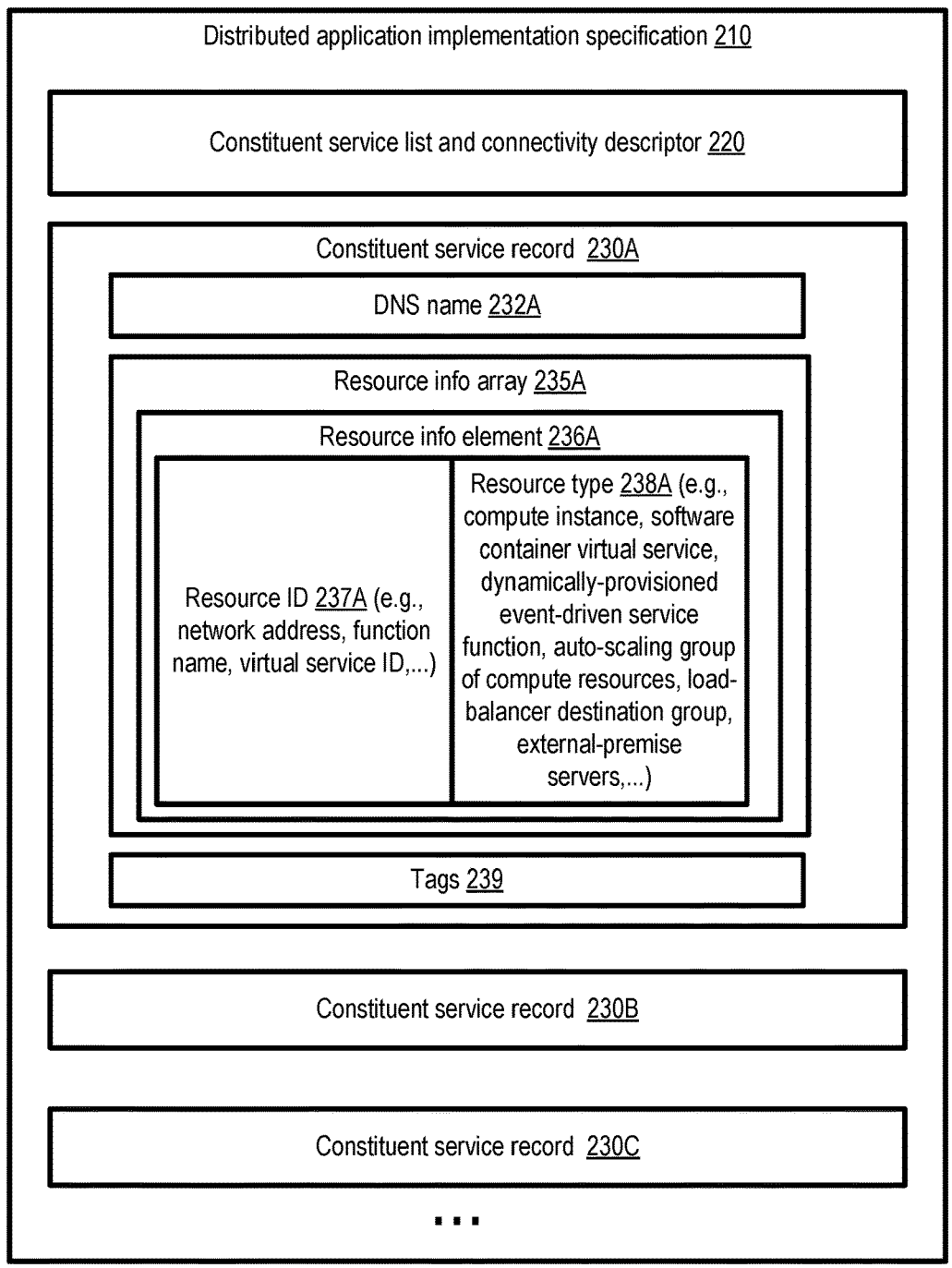
FIG. 2 illustrates example elements of a distributed application implementation specification which may be stored at a traffic management service responsible for assigning traffic processing agents for the distributed application, according to at least some embodiments.

FIG. 2 illustrates example elements of a distributed application implementation specification which may be stored at a traffic management service responsible for assigning traffic processing agents for the distributed application, according to at least some embodiments. At least a portion of the contents of the specification 210 may be indicated by a client via programmatic interfaces of a TMS.

Specification 210 may include a constituent service list and connectivity descriptor 220 in the depicted embodiment. For example, for DA 191A of FIG. 1, the constituent service list may include CS1, CS2 and CS3, and a connectivity descriptor may indicate that internal requests are expected to flow from CS1 to CS2 and from CS1 to CS3. For DA 191B of FIG. 1, the constituent service list may include CS4 and CS5, and the connectivity descriptor may indicate that internal requests are expected to flow from CS4 to CS5. More complex connectivity descriptors may be used in some embodiments. For example, some connectivity descriptors may indicate specific conditions under which traffic is expected between respective pairs of constituent services, or may provide connectivity information at a finer granularity (such as a resource granularity or a resource-group granularity rather than at a constituent service granularity). In some implementations, the connectivity descriptors may indicate the specific types of traffic processing operations to be performed for inter-constituent-service traffic; in other embodiments, instead of incorporating traffic processing requirements within the connectivity descriptors, separate traffic processing descriptors may be used to indicate the types of operations that the TPAs are to perform with respect to received traffic.

In at least some embodiments, respective records 230 (e.g., 230A, 230B, 230C, and so on) for each of the constituent services indicated in the service list and connectivity descriptor 220 may be stored at the TMS. A given constituent service record such as 230A may indicate a DNS name 232 (e.g., 232A), and an array of records 235 (e.g., 235A) about the resources used for the constituent service. An individual element such as 236A of the resource information array 235 may indicate an identifier 237A of the resource, as well as the type 238A of the resource. Resources used to implement a component of a constituent service may be identified using any of several types of identifiers in the depicted embodiment—e.g., a network address such as an Internet Protocol address may be used, a name of a function which can be executed by providing the name to a computing service (such as an event-driven dynamically-provisioned computing service implementing a functional programming model) may be used, a virtual service identifier of a service implemented using software containers may be used, and so on.

Resources of a variety of different types 238 may be used to implement the constituent services of a distributed application in some embodiments, and TPAs may be configured for each of the different resource types. For example, some constituent services may be implemented at least in part using compute instances of a VCS, or using a virtual service implemented using software containers of a container management service of a provider network. As mentioned above, portions of the functionality of a constituent service may be implemented using functions submitted to an event-driven dynamically-provisioned computing service in some embodiments. In at least one embodiment, a computing service of a provider network may support the establishment of auto-scaling groups of compute resources (such as compute instances, non-virtualized servers, graphics servers and the like), with the computing service being responsible for automatically adding or removing compute resources in response to changing workload levels based on rules approved by service clients. Such auto-scaling groups may be used to implement some constituent services in the depicted embodiment. In some embodiments, a load balancing service of a provider network may enable its clients to designate a group of destinations among which a specified workload is to be automatically distributed by the load balancing service using load balancing policies selected by the clients, and such destination groups may be used to implement at least a portion of a constituent service. In at least one embodiment, as discussed in the context of FIG. 1, some constituent services may be implemented using servers located at premises external to the provider network at which the TMS is implemented. In some embodiments, a TMS may be able to process inter-constituent-service traffic originating at, or directed to, any types of resources which have network addresses to which routes can be created from TPAs, regardless of the specific hardware and/or software used for the resources. In some embodiments, clients may specify one or more tags 239 (e.g., strings or numerical values selected by the clients) for a given constituent service, and such tags may be used to create logical groups of constituent services for which similar types of processing tasks can be requested.

Example Request/Response Formats and Traffic Processing Tasks

Figure 3:
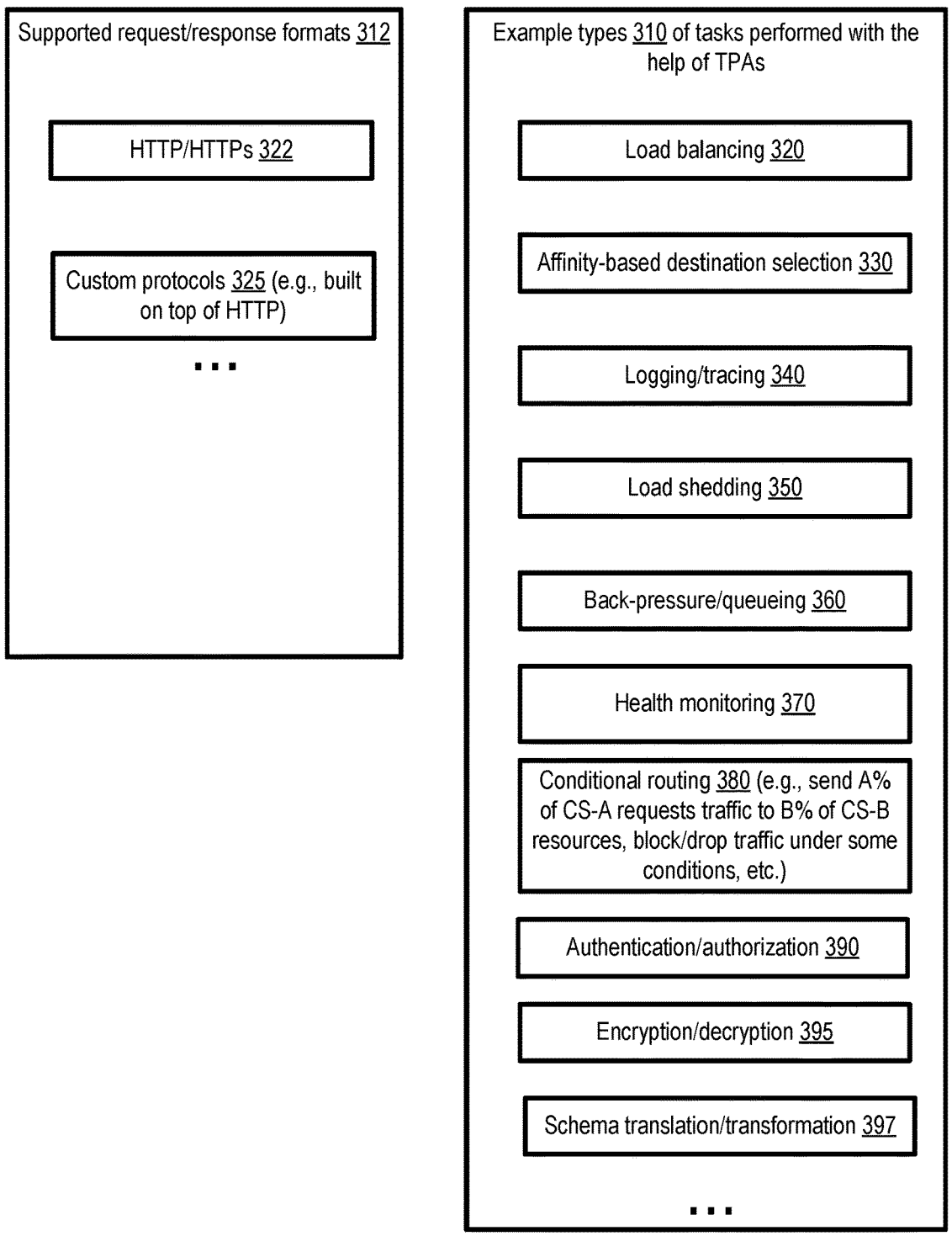
FIG. 3 illustrates example supported request/response formats and example types of tasks which may be performed for distributed applications using traffic processing agents, according to at least some embodiments.

In order to perform some types of processing requested by clients, the TPAs of a TMS may have to (at least partially) parse the messages sent from one constituent service of a distributed application to another. FIG. 3 illustrates example supported request/response formats and example types of tasks which may be performed for distributed applications using traffic processing agents, according to at least some embodiments.

The request/response formats 312 supported by a TMS may include, among others, HTTP or HTTPs (secure HTTP) 322 and/or custom protocols 325 developed by TMS clients for their distributed applications. In some embodiments, TMS clients may employ custom protocols which are built on top of HTTP (e.g., such protocols may involve the use of headers and/or body formats which are not part of the HTTP standards). In other embodiments, application layer protocols independent of HTTP or HTTPs may be employed for at least some types of communications between constituent services. XML (Extended Markup Language), JSON (JavaScript Object Notation) and the like may be used for structuring the contents of some inter-constituent-service traffic in various embodiments.

Examples types 310 of tasks which may be performed with the help of TPAs of a TMS may include load balancing 320, affinity-based destination selection 330, logging/tracing 340, load shedding 350, back-pressure or queueing 360, health monitoring 370, conditional routing 380, authentication/authorization 390, encryption/decryption 395, schema translation/transformation 397, and so on in the depicted embodiment. In some embodiments, combinations of these types of tasks may be requested by a client; for example, a client may request that load balancing, authentication and tracing all be performed for traffic between a given pair of constituent services of a particular distributed application.

In order to perform load balancing 320, a TPA may have to be provided information about the set of destination resources to which a request can be routed, and the load balancing algorithm to be used for selecting a particular destination from the set. Any of a wide variety of load balancing algorithms may be supported at TPAs, such as LRU (least recently used), random selection, round-robin, and so on. In affinity-based destination selection 330, information about the affinity between respective sources and destinations may be maintained or obtained at a TPA—for example, it may be the case the requests from a resource R1 of a constituent service CS1 have to preferably be delivered to one of a group (R20, R21) of resources of a different constituent service CS2, independent of load-balancing considerations, while resources from a different resource R2 of CS1 may have to be preferably delivered to resource R22 of CS2, and so on. In some implementations, once a particular destination has been selected for requests from a particular source, that source may be assumed to have an affinity for the selected destination, and further requests from the same source may be sent on to the same destination by a TPA.

Logging/tracing tasks 340 may comprise storing records, e.g., at a persistent data store, indicating the receipt or delivery of messages by a TPA. In at least some embodiments, a client of the TMS may specify the data stores, storage services, or specific destinations to which the trace or log records are to be directed by TPAs. In one embodiment, a special request header may be added to messages generated by constituent services to identify the client request which led to the messages, so that the flow of messages corresponding individual client requests can be traced or logged. In one embodiment, TPAs may be configured (e.g., based on client preferences or TMS heuristics) to store log records or trace records locally in a buffer, and transfer the contents of the buffers to remote persistent storage devices periodically to reduce overhead.

In order to implement load shedding 350, a TPA may determine, based for example on metrics obtained from other TPAs or sources indicated in a traffic processing descriptor, if/when a destination resource or destination constituent service is overloaded. In such overload situations, some number of requests from a source constituent service, which would otherwise have been sent on to the destination, may instead be dropped or discarded in some embodiments. For back pressure or queueing 360, in one embodiment individual TPAs may maintain queues of messages to be delivered to respective destinations, and delay the delivery of some messages (or responses to messages) under certain workload conditions to help ensure, for example, that resource utilization levels at various components of the constituent services are kept within desired limits.

Health monitoring tasks 370 may involve the TPAs keeping track of the responsiveness of destination resources (or other TPAs which may be used to route some types of messages), and informing one or more entities (e.g., the client on whose behalf the distributed application is being implemented) if/when resources appear to be unhealthy or unresponsive.

Conditional routing 380 may be used in several scenarios. For example, if a new version of a constituent service has been developed, the updated version may initially be deployed at only a subset of resources of the constituent service so that it can be tried out before the update is applied globally to all the resources of the service. In such a scenario, the equivalent of a request to send A % (e.g., 2%) of a constituent service's requests to a specified B % (e.g., 1%) of the resources of the destination constituent service (at which the updated version) has been deployed may be sent to a TPA. The percentages may be changed as more confidence is gained with respect to the update. Similarly, in some embodiments, conditional routing may be used to test different designs or implementations (not necessarily updates): e.g., implementation I1 of a constituent service may be deployed to 20% of the resources allocated for the service, while implementation I2 may be deployed to the remaining 80%, and specified fractions of the requests directed to the constituent service may be sent to the different implementations I1 and I2 using conditional routing 380. In some embodiments, a client may indicate traffic processing requirements which specify conditions under which traffic from a particular constituent service is to be blocked or dropped instead of being sent to another constituent service; such blocking or dropping of packets may also be considered a form of conditional routing 380.

In at least some embodiments, a given constituent service may have to grant permissions to allow requests from another constituent service to be sent to it. The TPAs may perform at least some authentication/authorization operations 390 in such scenarios in one embodiment. For example, a TPA may verify, prior to causing the one or more packets to be delivered, that a permission setting associated with the recipient constituent service allows delivery of packets on behalf of the source constituent service. In at least some embodiments, an access management service implemented at a provider network may be used to define roles and/or capabilities used for granting such permissions, and the TMS may provide seamless integration with such an access management service.

In some embodiments, a TPA may be used to terminate a TLS (Transport Layer Security) session established between a source constituent service and a recipient constituent service; if desired by the client, the TPA may re-encrypt the messages of the session before transmitting them on to the intended destination. In other embodiments, encryption/decryption tasks 395 may be performed at TPAs even if TLS or a similar security protocol is not being used.

In at least one embodiment, TPAs may be used to transform received messages in other ways before sending the transformed versions on to intended recipients. For example, the received messages may be structured according to one schema or format, and the TPAs may translate the contents of the messages according to a different schema or format preferred by the recipient constituent service. Such schema translations/transformations 397 may help reduce the amount of computing resources which have to be employed at the sending or receiving resources in some embodiments—as such, the TPAs may in a sense offload some of the work from the resources being used for the constituent services.

Example Flows of Messages to and from Traffic Processing Agents

Figure 4:
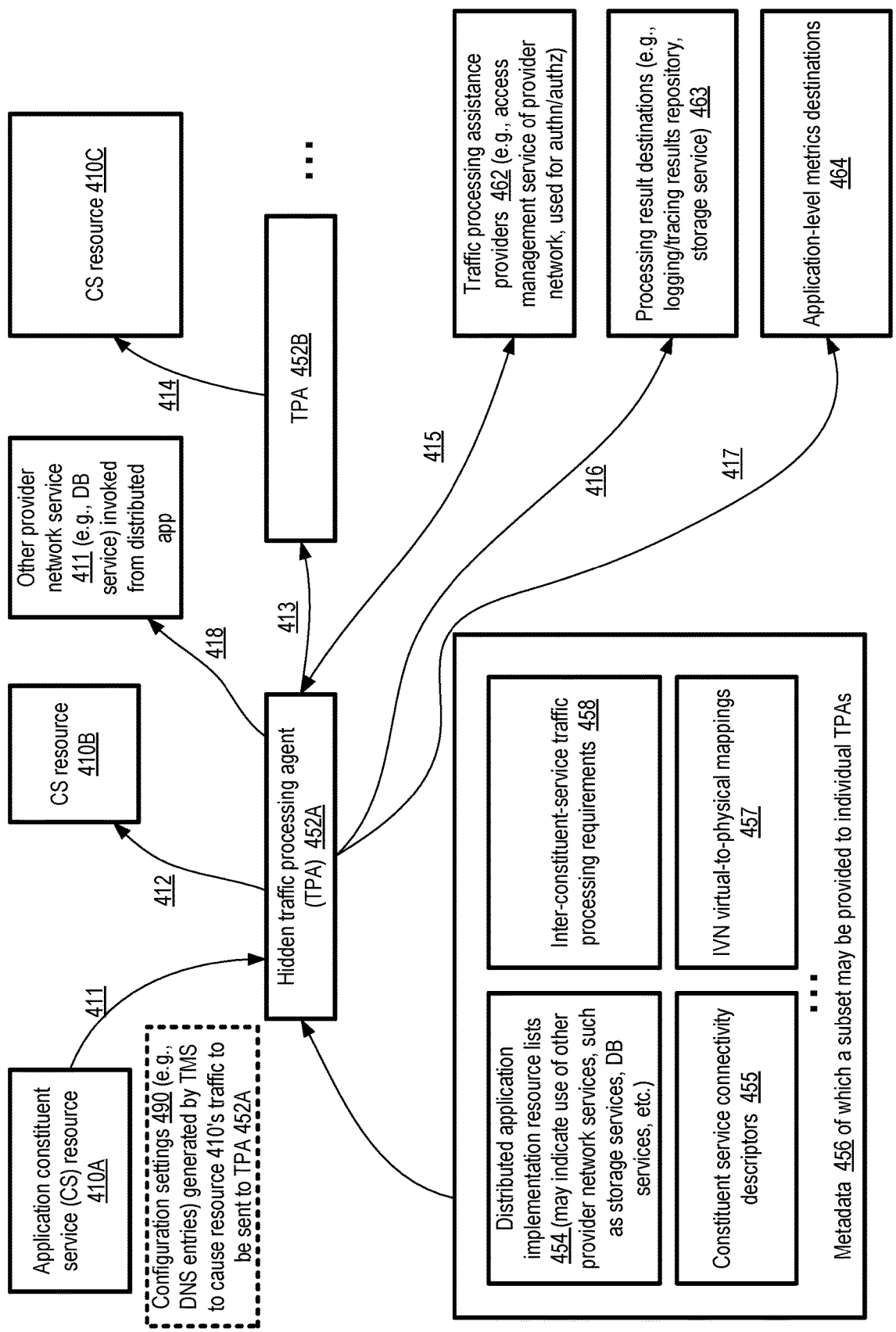
FIG. 4 illustrates example flows of metadata and messages to and from hidden traffic processing agents, according to at least some embodiments.

FIG. 4 illustrates example flows of metadata and messages to and from hidden traffic processing agents, according to at least some embodiments. In order for the TPAs 452 (e.g., 452A and 452B) of a TMS to perform the requested types of traffic processing, including simply forwarding messages between constituent services of a distributed application, a number of preliminary configuration operations may be performed by the TMS control plane servers (e.g., similar to servers 150 shown in FIG. 1) in various embodiments, and metadata may have to be propagated from the TMS control plane to the TPAs. For example, one or more configuration settings 490 (such as DNS entries) used at the constituent service resources (such as 410A) may be set such that traffic directed from the resource to a different constituent service is routed to a TPA such as 452A. In one embodiment, if a DNS name for a destination constituent service is "a.b.c.d", for example, a wildcard DNS record for "*.b.c.d" or "*.c.d" may be created and linked to a local network address (e.g., a network address within the same isolated network as the constituent service resource) set up as a TMS endpoint. When a resource such as 410A opens a connection to that local network address, the connection may be tunneled to a TPA 452A assigned for the traffic generated at the resource 410A in such an embodiment.

The TPS control plane may provide at least a subset of several kinds of metadata 456 to TPAs 452 in the depicted embodiment. Note that different TPAs may be provided distinct metadata, relevant to the specific types of responsibilities or traffic processing requirements being assigned to the TPAs, in some embodiments; not all the TPAs may receive identical metadata. In at least one embodiment, the metadata (including traffic processing requirements 458) provided to different TPAs assigned to a single constituent service or a single distributed application may differ. Relevant portions or all of the lists 454 of resources implementing the constituent services of the distributed applications may be propagated to the TPAs. In some embodiments, a given distributed application resource, running at a VCS compute instance or a server external to the provider network, may utilize resources of a variety of other services of the provider network, such as a database service, a storage service and so on, and an indication of such other services may also be included in the resource list 454. Constituent service connectivity descriptors 455 of the kind discussed earlier (e.g., in the context of FIG. 2) may be provided to TPAs in at least some embodiments. Inter-constituent-service traffic processing requirements 458, detailing the specific combinations of tasks (e.g., tasks of one or more of the types 310 of FIG. 3) to be performed by the TPAs, may be sent to the TPAs in at least some embodiments. In some embodiments in which IVNs are being used for the constituent services, virtual-to-physical resource mappings 457 of the IVNs may be provided to at least some TPAs, which can be used to direct traffic appropriately using encapsulation protocols of the VCS.

Depending on the specific type of processing to be performed, a number of different outbound packets may be sent from a TPA such as 452A in response to receiving a message or request 411 (which may comprise one or more packets) from a source resource 410A in various embodiments. In some cases, the TPA 452A may have to communicate with one or more traffic processing assistance providers 462, as indicated by arrow 415: for example, if authentication/authorization policies for the inter-constituent-service traffic are implemented at an access management service of the provider network. Using communications 415, the TPA may be able to determine whether contents of the message 411 are to be sent on to a recipient constituent service resource such as 410B or 410C. In some cases, a TPA such as 452A may be able to transmit a message 412 corresponding to message 411 directly to a destination resource 410B of a different constituent service. In other cases, a message 413 may first have to be sent to another TPA 452B, which may forward the message to a destination resource such as 410C of the targeted constituent service.

In some embodiments, as mentioned earlier, the source resource 410A may invoke some other provider network service 411 (such as a database service, a storage service, or a machine learning service) to perform some operations of the distributed application. The other service may be treated analogously to a constituent service of the distributed application by the TMS in at least some embodiments. The TPA 452A assigned to the resource may, for example, send a request message 418 to the other service 411 on behalf of the source resource 410A.

In various embodiments, a TPA such as 452A may send some results or records generated by the traffic processing to one or more result destinations 463. For example, if a log record or a trace record is created based on the client's traffic processing requirements 456, a message 416 containing the record may be sent to a storage service or repository.

In addition, in some embodiments metrics of various types may be collected/generated at the TPAs, and messages 417 containing the metrics may be sent to one or more destinations 464 (e.g., a metrics repository or metrics reporting service indicated by the client). The TMS may for example generate and provide metrics at the application level, so that clients can be made aware of the amounts of traffic being generated at different constituent services, which constituent services (if any) are less responsive than others, and so on. Such application-aware metrics may be difficult to obtain from lower-level components of the system, such as operating systems, hardware monitoring devices and the like, which may not be aware of the high-level architecture of the distributed application. The application-aware metrics provided by the TMS may enable clients to discover constituent services which are not performing as desired more quickly, and take corrective actions to ensure that the overall performance objectives (e.g., latency, throughput, etc.) of the distributed application are met.

Example Allocations of Traffic Processing Agents

Figure 5:
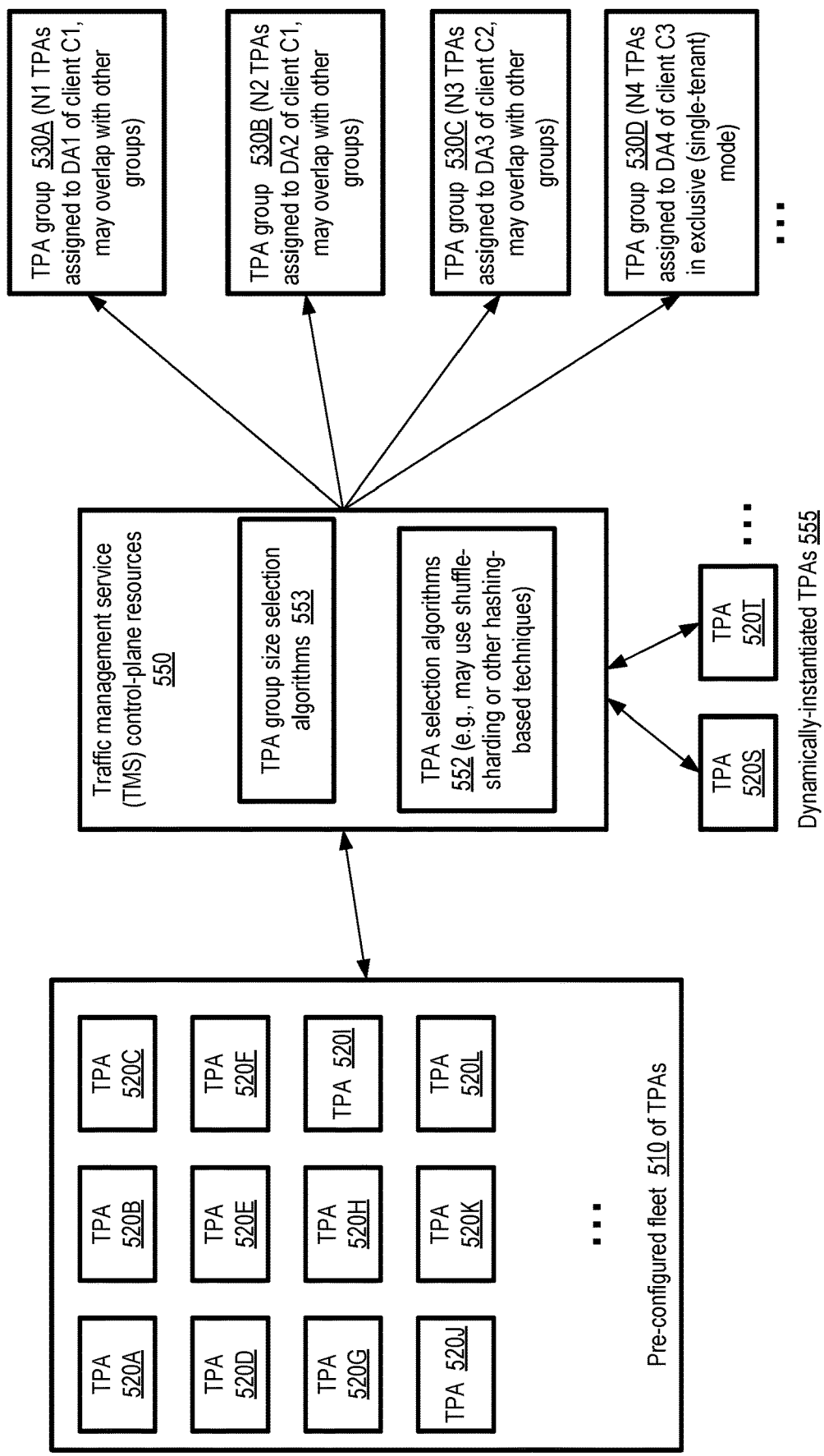
FIG. 5 illustrates example allocations of pre-configured and dynamically-instantiated traffic processing agents in multi-tenant and single-tenant modes, according to at least some embodiments.

FIG. 5 illustrates example allocations of pre-configured and dynamically-instantiated traffic processing agents in multi-tenant and single-tenant modes, according to at least some embodiments. In the depicted embodiment, TMS control plane resources (similar in features and functionality to servers 150 of FIG. 1) may set up a fleet 510 of pre-configured TPAs 520, such as TPAs 520A-520L, e.g., before any specific requests for processing traffic of distributed applications is received at the TMS. When deciding which specific TPAs are to be assigned to a given constituent service of a distributed applications, the TMS control plane resources 550 may take a number of factors into account in various embodiments, including for example the number of distinct resources being used to implement the constituent service, whether the client on whose behalf the traffic is to be processed has indicated a preference for single-tenant TPAs versus multi-tenant TPAs, and so on.

In addition to these factors, the number of free TPAs of the pre-configured fleet 510, and/or the current resource utilization levels of the TPAs of the fleet may be provided as input to a TPA group size selection algorithm 553 in some embodiments. The output of the group size selection algorithm may determine the exact number of TPAs to be included in a group 530 to be assigned to a given distributed application. For example, TPA group 530A comprising N1 TPAs may be assigned to distributed application DA1 of a client C1 in multi-tenant mode, such that some or all of the N1 TPAs may be shared with other distributed applications. Similarly group 530B with N2 TPAs may be assigned to a different distributed application DA2 of client C1 in multi-tenant mode, and group 530C with N3 TPAs may be assigned to a distributed application DA3 of a client C2 in multi-tenant mode. Group 530D may comprise N4 TPAs assigned for the exclusive use of distributed application DA4 of a client C3 who has programmatically indicated a preference for single-tenant TPAs. Metadata indicating the tenancy settings of the TPAs (e.g., whether a given TPA is configured in single-tenant mode or in multi-tenant mode) may be stored at the TMS in various embodiments.

The specific TPAs to be included in a given group 530 may be selected using a variety of algorithms 552 in different embodiments, e.g., using shuffle sharding or other hashing-based techniques. For example, in some embodiments, an identifier of the client may be concatenated with an identifier of a distributed application, an identifier of a constituent service, and an identifier of the resource to which a TPA is to be assigned, and the concatenation result string may be included in the input to a hash function whose output indicates the specific TPA to be used. Other algorithms may be employed in different embodiments for TPA selection.

In at least some embodiments, instead of or in addition to using a pre-configured fleet 510, one or more TPAs may be dynamically instantiated or set up by the TMS control plane resources. In the embodiment depicted in FIG. 5, such dynamically instantiated TPAs 555 include TPA 520S and 520T. TPAs may be instantiated dynamically for a variety of reasons in different embodiments—e.g., because a TMS client has requested that the TPAs used for the client should be dynamically instantiated, or if the resource (e.g., CPU, network, or memory) utilizations of a set of TPAs allocated to a given client exceeds a threshold and a TPA from the fleet 510 is not available, and so on. In some embodiments, all TPAs may be dynamically instantiated as needed based on client requests received at the TMS.

Example Programmatic Interactions

Figure 6:
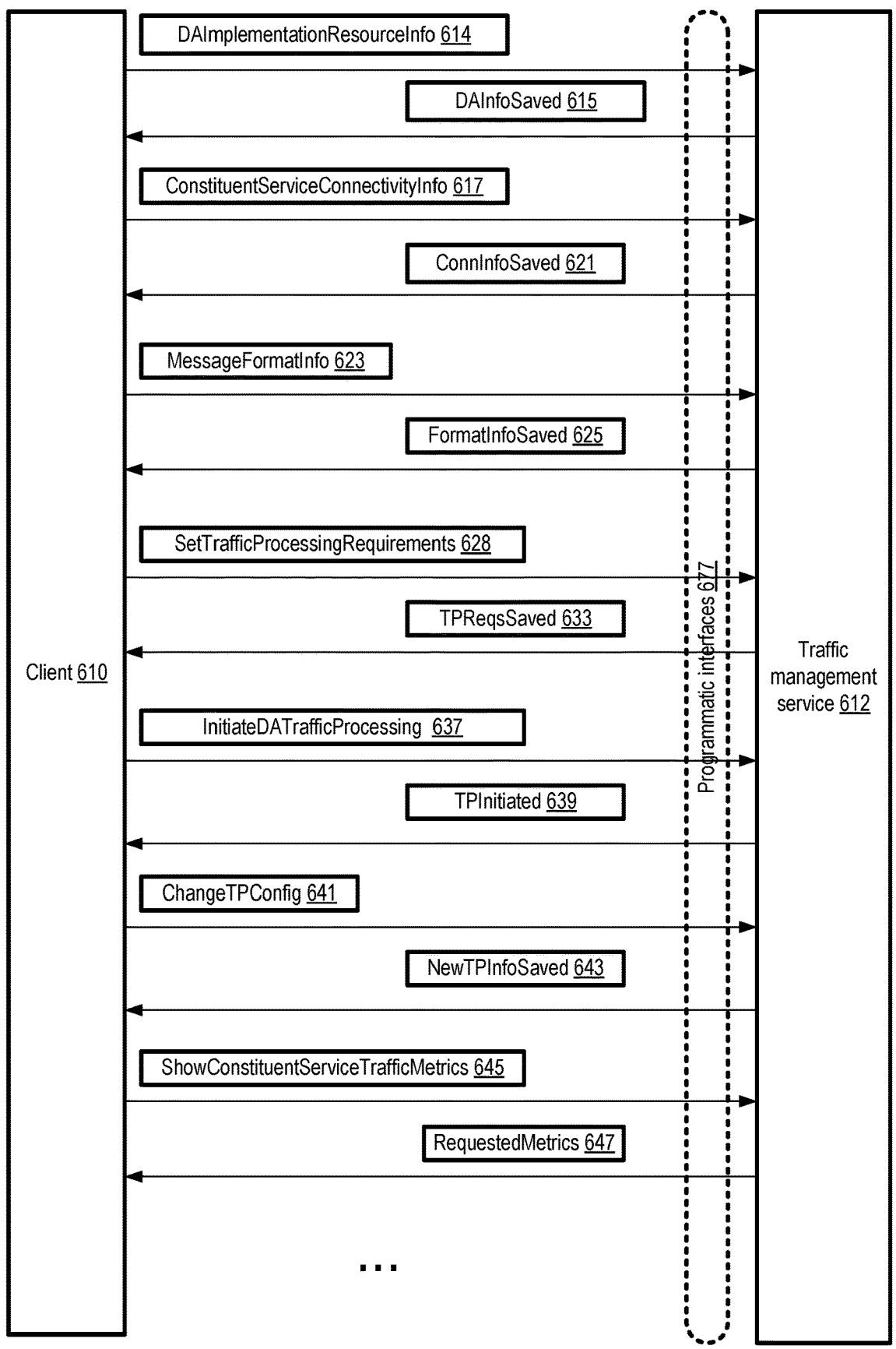
FIG. 6 illustrates example programmatic interactions between a client and a traffic management service for distributed applications, according to at least some embodiments.

FIG. 6 illustrates example programmatic interactions between a client and a traffic management service for distributed applications, according to at least some embodiments. In the depicted embodiment, a TMS 612, similar in features and functionality to the TMS 180 of FIG. 1, may implement one or more programmatic interfaces 677, such as a web-based console, a set of application programming interfaces (APIs), command-line tools, graphical user interfaces and the like. The interfaces 677 may be used by TMS clients 610 to submit various types of requests and messages pertaining to processing distributed application traffic, and receive corresponding responses.

Information identifying the set of resources being used to implement the constituent services of a distributed application may be provided to the TMS 612 via a DAImplementationResourceInfo message 614 by a client 610 in the depicted embodiment. In some embodiments, such a message may include a specific indication that the client 610 has opted in (i.e. agreed to the use of) the TMS on the client's behalf for the distributed application. In other embodiments, a separate message indicating the opt-in may be sent by the client 610 via the programmatic interfaces 677. After the information is stored at the metadata repositories of the TMS, a DAInfoSaved message 615 may be sent to the client in some embodiments by the TMS 612. Information specifying the expected flow of requests/responses among the constituent services may be provided in a ConstituentServiceConnectivityInfo message 617 in some embodiments, and a ConnInfoSaved message 621 may be sent back to the client 610 to indicate that the connectivity information has been saved at the TMS. In effect, the messages 614 and 617 may collectively provide contents of a distributed application implementation specification similar to specification 210 of FIG. 2 to the TMS; in some embodiments, a single message from the client may be used instead of separate messages for connectivity and implementation resources.

In at least some embodiments, a client 610 may specify the message formats used for inter-constituent-service communications of a distributed application to the TMS via a MessageFormatInfo message 623. Message 623 may, for example, indicate whether a standard protocol such as HTTP is being used, or whether some custom protocol is being used. If a custom protocol is being used, an indication of how the individual request message boundaries, headers, bodies etc. may be recognized or parsed by the TPAs may also be provided in some embodiments, e.g., in the message 623 or in additional messages. After the format information is received and stored, a FormatInfoSaved message 625 may be sent to the client 610 in some embodiments.

A SetTrafficProcessingRequirements message 628 may be sent to the TMS via interfaces 677 in some embodiments, indicating the specific types of processing to be performed for at least some inter-constituent-service messages. As discussed in the context of FIG. 3, any combination of a wide variety of processing requirements may be specified by the client. In some implementations, the processing requirements may be indicated in the connectivity descriptors (e.g., in message 617) instead of using a separate message 628. The TMS may send a TPReqsSaved response message 633 indicating that the processing requests have been saved in some embodiments.

Having provided the information needed at the TMS to begin processing the traffic of a distributed application (e.g., using some combination of messages 614, 617, 623 and 628), a client may submit an InitiateDATrafficProcessing request 637 in some embodiments to request that the TMS start performing the requested processing. In response, TPAs may be assigned and/or activated to initiate the processing by the TMS, and a TPInitiated response message 639 may be sent to the client 610 in the depicted embodiment.

Over time, a client 610 may modify the configuration of a distributed application—e.g., new resources may be added to some constituent service, a new version of software may be deployed which requires conditional routing of the kind discussed in the context of FIG. 3, and so on. One or more ChangeTPConfig messages 641 may be sent by the client 610 to indicate such changes in the depicted embodiment. The changes may in effect modify at least some of the information provided by the client earlier in messages 614, 617, 623, 628 and the like. If desired, connectivity between specified pairs of constituent services of a distributed application may be discontinued temporarily or permanently using a ChangeTPConfig message 641 in some embodiments. The TMS may save records of the changes, modify the TPA groups assigned to the client's distributed application (e.g., by providing updated metadata to existing TPAs, adding/removing TPAs etc.), and send a NewTPInfoSaved message 643 to the client in some embodiments.

In some embodiments, a client 610 may submit a ShowConstituentServiceTrafficMetrics request 645 via programmatic interfaces 677 to view various metrics collected by the TMS. Such metrics, which may provide insights into the traffic and performance of the different constituent services or their resources, may be provided by the TMS in one or more RequestedMetrics messages 647. Other types of programmatic interactions associated with traffic processing of distributed applications, not shown in FIG. 6, may be supported by a TMS 612 in some embodiments.

Example TPA Implementations

Figure 7:
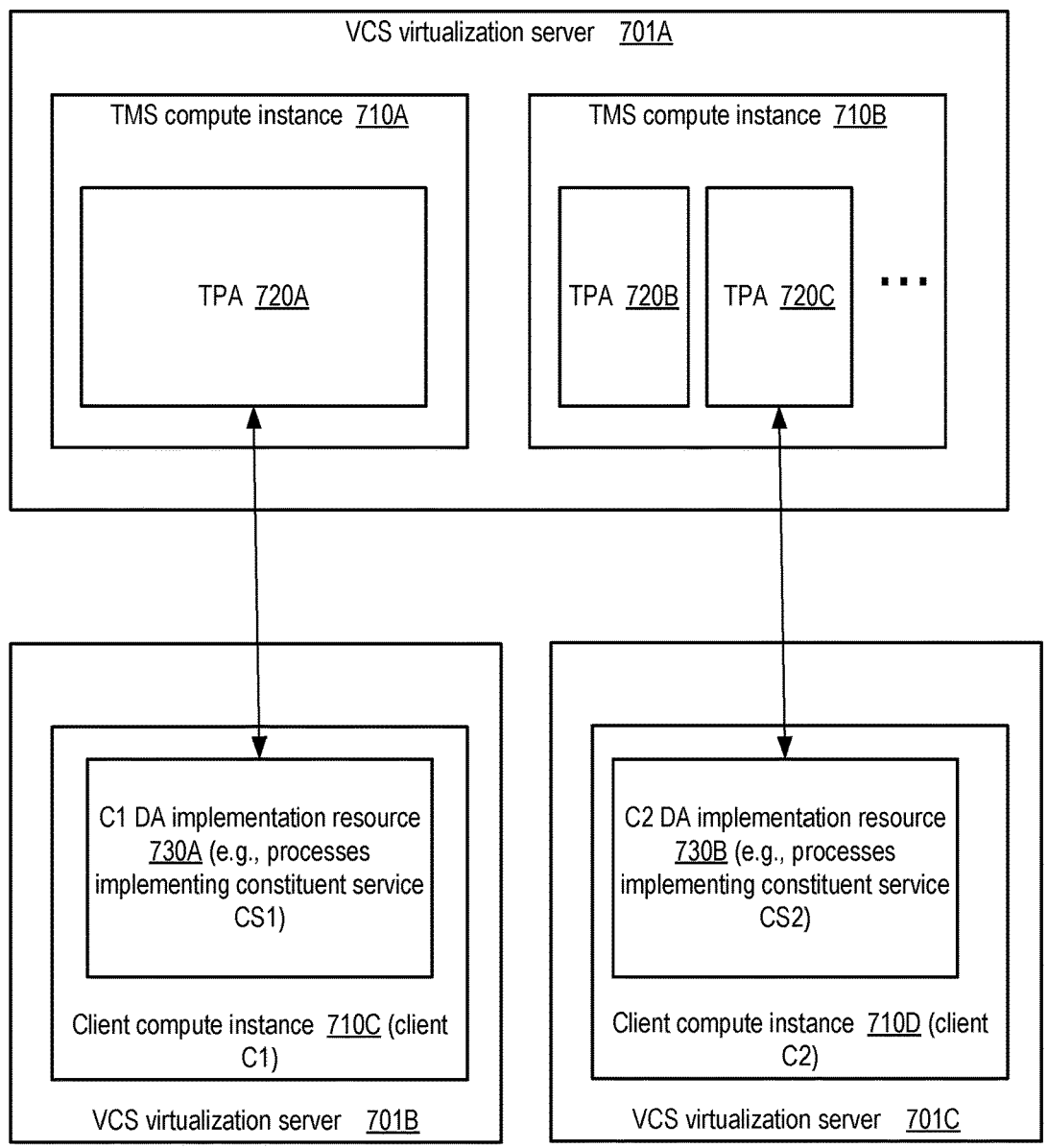
FIG. 7 illustrates an example use of compute instances of a virtualized computing service for traffic processing agents, according to at least some embodiments.

As mentioned earlier, a number of different techniques may be employed to implement individual TPAs in various embodiments. FIG. 7 illustrates an example use of compute instances of a virtualized computing service for traffic processing agents, according to at least some embodiments. In the depicted embodiment, at least some portions of the constituent services of various distributed applications of TMS clients may be run using some set of compute instances of a virtualized computing service, and TPAs may be run using other compute instances.

VCS virtualization server 701B comprises a client compute instance 710C of a client C1 of the TMS, and VCS virtualization server 701C comprises a client compute instance 710D of client C2. Client compute instance 710C comprises an implementation resource 730A (e.g., a set of one or more processes or threads) of a distributed application of client C1. Client compute instance 710D comprises an implementation resource 730B of a distributed application of client C2.

A number of compute instances may be set up to host TPAs of the TMS in the depicted embodiment. For example, a single VCS virtualization server 701A may include TMS compute instance 710A and TMS compute instance 710B. Such TMS compute instances may run at a higher privilege level, and/or may be more tightly integrated with the networking virtualization components of the VCS than client compute instances such as 710C and 710D in at least some embodiments. For example, networking virtualization management components of the virtualization servers 701B and 701C may be provided with addresses and/or other configuration information of the TMS compute instances, and may use this information to transfer packets originating at the DA implementation resources 730A or 730B to the TMS compute instances. Within each of the TMS compute instances 710A and 710B, one or more TPAs may be instantiated. TPA 720A may be instantiated using one or more processes of TMS compute instance 710A, and assigned to process traffic of resource 730A, for example. TPAs 720B and 720C may be launched within TMS compute instance 710B, and TPA 720C may be assigned for processing traffic of resource 730B. Thus, in the depicted embodiment, a given VCS virtualization server such as 701A may be used for one or more TMS compute instance, and a given TMS compute instance in tune may be used for one or more TPAs. In other embodiments, a given VCS virtualization server may be used for no more than a single TMS compute instance, and/or a given TMS compute instance may be used for no more than a single TPA. As mentioned earlier, in some embodiments, virtualization management software components such as hypervisors or administrative instances of operating systems running at a virtualization host (e.g., on the primary processors or CPUs of the host) may be used to implement TPA functionality.

Figure 8:
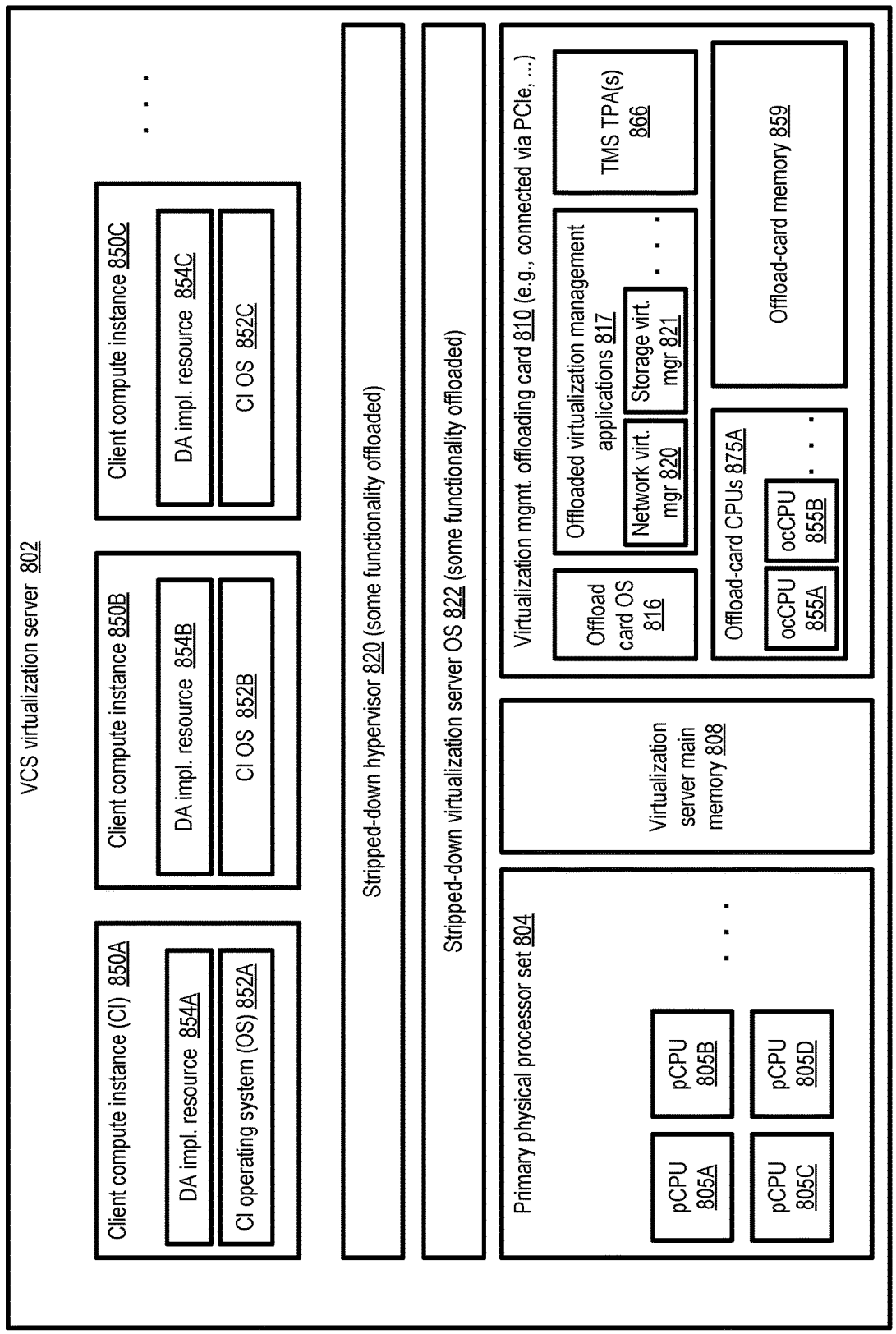
FIG. 8 illustrates an example use of a virtualization management offloading card to implement traffic processing agents, according to at least some embodiments.

FIG. 8 illustrates an example use of a virtualization management offloading card to implement traffic processing agents, according to at least some embodiments. As shown, VCS virtualization server 802 comprises a set of primary physical processors 804, including primary CPUs (pCPUs) 805A, 805B, 805C and 805D as well as a main memory 808 in the depicted embodiment. The primary physical processor set 804 and the VH main memory 808 may be used by a stripped-down virtualization server operating system (OS) 822, a stripped-down hypervisor 820, as well as various compute instances (CIs) 850 (e.g., 850A, 850B, or 850C) set up on behalf of clients of the VCS at the virtualization server. The OS 822 and the hypervisor 820 may be referred to as being "stripped-down" because a portion of their respective functions may be offloaded to programs running at a virtualization management offloading card 810 in the depicted embodiment. As a result of such offloading, a larger fraction of the computing power of the primary physical processor set 804 may become available for compute instance 850 in the depicted embodiment than in some other approaches towards virtualization, in effect reducing the overhead of virtualization management imposed on the resources that could be used on behalf of clients of the VCS.

In some embodiments, an offload card 810 may be connected via a peripheral interconnect to the primary processor set 804 of the virtualization host. For example, in some implementations, PCIe may be used, while in other implementations USB or other types of interconnects may be used. The offloading card 810 may include a set of local offload-card CPUs 875 (referred to as ocCPUs), such as ocCPU 855A and 855B in the depicted embodiment, as well as offload-card memory 859. The program instructions executed to implement an offload card operating system 816, a set of offloaded virtualization management applications 817, and/or one or more TPAs 866 of a TMS similar to TMS 180 of FIG. 1 may be stored in the memory 859. The offloaded virtualization management applications may include, for example, a network virtualization manager 820, and/or a storage virtualization manager 821 in the depicted embodiment. Various aspects of network traffic management (including, for example, the implementation of encapsulation protocols and the like) may be handled by network virtualization manager 820 in the depicted embodiment. The storage virtualization manager 821 may enable the compute instances to access one or more virtualized storage volumes and/or other types of storage devices (e.g., local storage devices, and/or remote network-accessed storage devices) in at least some embodiments. The TPAs 866 may act as intermediaries with respect to inter-constituent-service traffic of distributed application resources 854 (e.g., 854A-854C) which may be run within client compute instances 850A-850C, along with respective compute instance operating systems such as 852A-852C. The TPAs 866 may perform one or more traffic processing tasks, similar to the tasks discussed in the context of FIG. 3, on messages generated at or directed to the DA implementation resources 854.

Example Provider Network Environment

Figure 9:
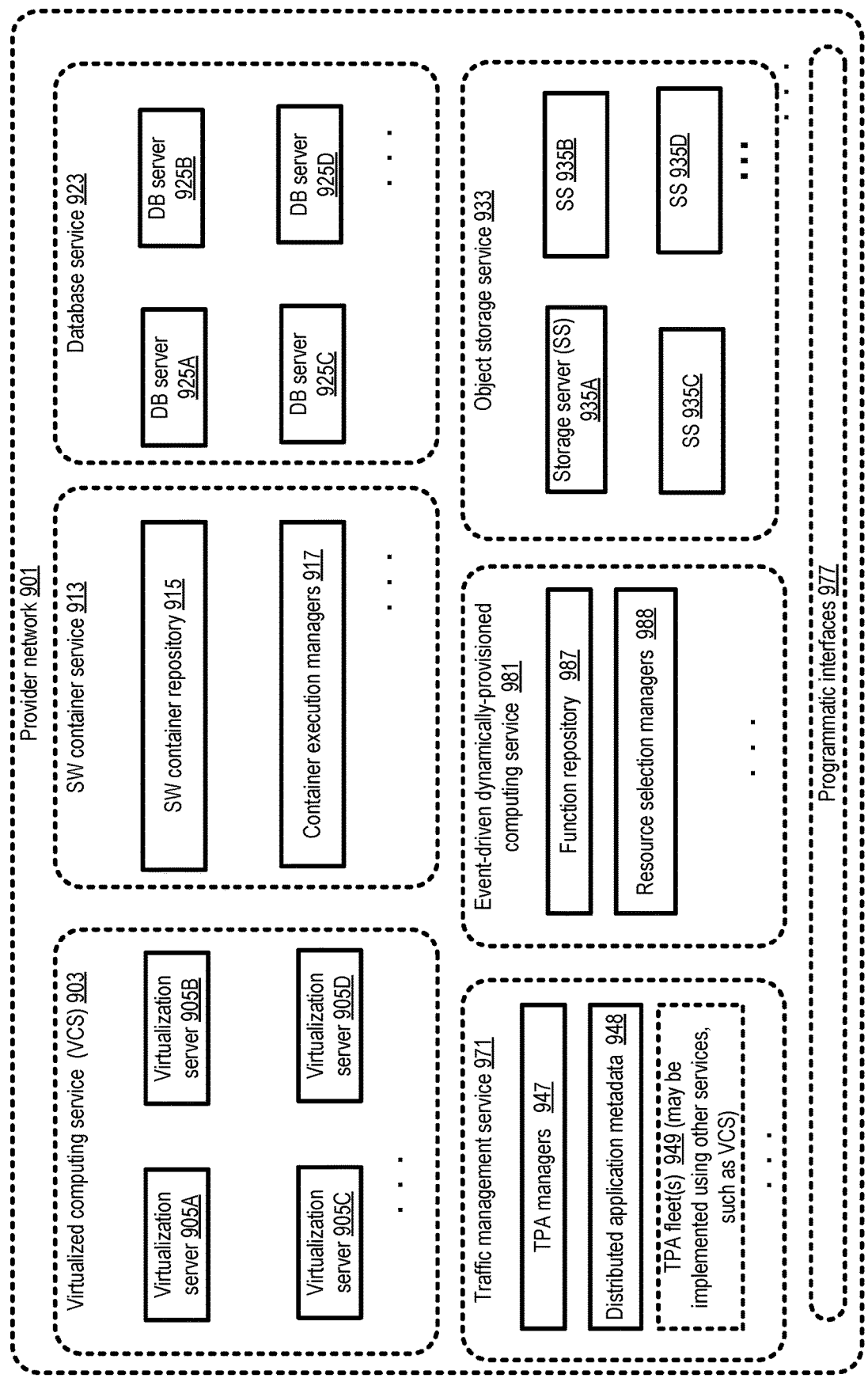
FIG. 9 illustrates an example provider network at which a traffic management service for distributed applications may be implemented, according to at least some embodiments.

FIG. 9 illustrates an example provider network at which a traffic management service for distributed applications may be implemented, according to at least some embodiments. In the depicted embodiment, provider network 901 may comprise resources used to implement a plurality of publicly-accessible services accessible over the Internet and other types of networks, including for example a VCS 903, a software container service 913, a database service 923, an object storage service 933, and an event-driven dynamically-provisioned computing service 981 as well as a TMS 971 similar in features and capabilities to TMS 180 of FIG. 1. The TMS 971 in turn may comprise at least a set of TPA managers 947 for one or more TPA fleets 949, and a collection of metadata 948 pertaining to the distributed applications of TMS clients. At least some of the TPAs of the fleets 949 may be implemented using resources of other services, such as virtualization servers 905A-905D of the VCS as discussed in the context of FIG. 7 and FIG. 9

Generally speaking, components of a given service may utilize components of other services in the depicted embodiment—e.g., some software containers stored at repository 915 by clients of the software container service may be executed at virtualization servers 905 selected by container execution managers 917, portions of distributed applications running at compute instances of the VCS may submit requests to database servers 925 (e.g., 925A-925D) or storage servers 935 (e.g., 935A-935D) of object storage service 933, and so on. As mentioned earlier, some distributed applications may be implemented at least in part using software containers, which may be managed by software container service 913, or using functions executed at an event-driven dynamically-provisioned computing service 981. The dynamically-provisioned computing service 981 may implement a functional programming mode, wherein instead of allocating computing resources to clients, the service 981 (e.g., its resource selection managers 988) dynamically selects resources to execute specified functions (for which respective representations or programs may be stored at function repository 987) when triggered by client-specified events. The TMS 971 may assign TPAs to handle the traffic generated in scenarios in which constituent services of distributed applications use software containers managed by service 913, and/or in scenarios in which some of the functionality of the constituent services is implemented using functions managed by service 981 in the depicted embodiment. For portions of distributed applications which are implemented at premises external to the provider network 901, TMS 971 may instantiate TPAs at servers located at such premises in the depicted embodiment; in order for such TPAs to be set up, the appropriate permissions and networking configuration details (e.g., the IP addresses of the servers to be used for the TPAs) may be granted by the clients on whose behalf the distributed application traffic is to be processed. Individual ones of the services shown in FIG. 9 may implement a respective set of programmatic interfaces 977 which can be used by external and/or internal clients (where the internal clients may comprise components of other services) in the depicted embodiment.

Figure 10:
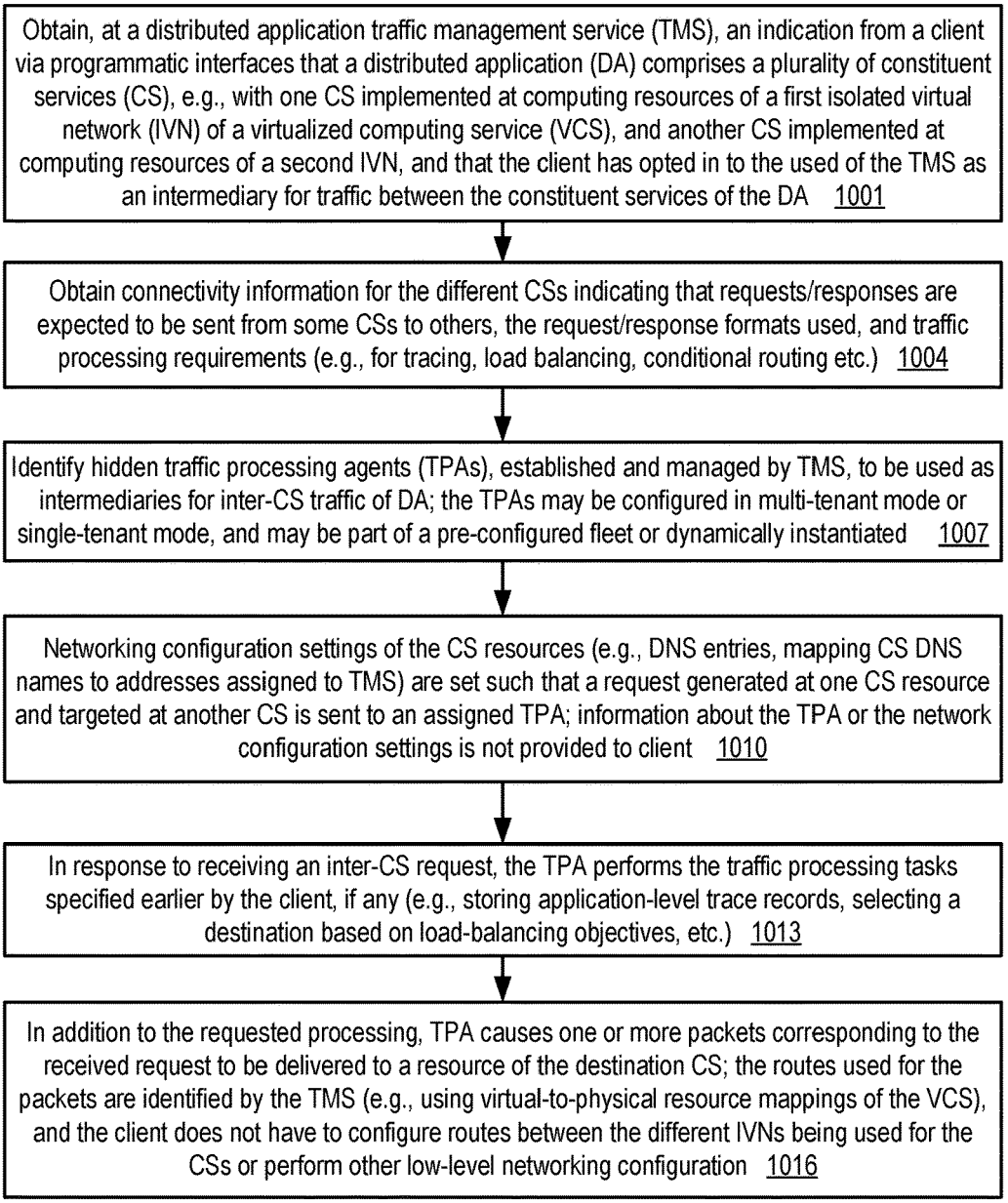
FIG. 10 is a flow diagram illustrating aspects of operations that may be performed at a traffic management service for processing network traffic flowing between constituent services of a distributed application, according to at least some embodiments.

Methods for Managing Inter-Constituent-Service Traffic of Distributed Applications FIG. 10 is a flow diagram illustrating aspects of operations that may be performed at a traffic management service (TMS) for processing network traffic flowing between constituent services of a distributed application, according to at least some embodiments. As shown in element 1001, an indication may be obtained at a TMS (similar in features and functionality to TMS 180 of FIG. 1) from a client via programmatic interfaces that a distributed application (DA) comprises a plurality of constituent services (CSs), and that the client has opted to use the TMS as an intermediary for traffic flowing between the CSs of the DA. For example, one CS may be implemented at computing resources of a first isolated virtual network (IVN) of a virtualized computing service (VCS), and another CS implemented at computing resources of a second IVN.

The TMS may also obtain connectivity information for the different CSs of the DA (element 1004), indicating that requests/responses are expected to be sent from some CSs to others in the depicted embodiment. In addition, the formats of the requests and responses may be determined at the TMS, and traffic processing requirements (e.g., for request tracing, load balancing, and/or other types of operations discussed earlier in the context of FIG. 3) for the inter-CS traffic may be obtained in at least some embodiments.

The TMS may identify one or more hidden traffic processing agents (TPAs), established and managed by the TMS, to be used as intermediaries for inter-CS traffic of DA (element 1007) in various embodiments. In some embodiments, for example, corresponding to each resource or implementation unit (such as a VCS compute instance) used to implement the CS at which requests for another CS may originate, a respective TPA may be identified and assigned. The TPAs may be configured in multi-tenant mode or single-tenant mode, and may be part of a pre-configured fleet or dynamically instantiated in different embodiments.

Networking configuration settings of the CS resources (e.g., DNS entries used at the CS resources, mapping CS DNS names to addresses assigned to the TMS) may be set in the depicted embodiment such that a request generated at one CS resource and targeted at another CS is sent to an assigned TPA (element 1010). Information about the TPAs or the network configuration settings may not be provided to the client in at least some embodiments. In some cases, clients may not even be made aware of the assignment of TPAs to their DAs.

In response to receiving an inter-CS request or message from a CS resource, the assigned TPA for that resource may perform the traffic processing tasks specified earlier by the client, if any (e.g., storing application-level trace records, selecting a destination based on load-balancing objectives, etc.) (element 1013). The TPA may parse at least a portion of the request based on the request/response format indicated by the client, and use the results of the parsing to perform the requested processing in some embodiments.

In addition to performing the requested processing, the TPA may cause one or more packets corresponding to the received request to be delivered to a resource of the destination CS in various embodiments (element 1016). The routes used for the packets may be identified by the TMS (e.g., using virtual-to-physical resource mappings of the VCS), and the client may not have to configure routes between the different IVNs being used for the CSs or perform other low-level networking configuration.

It is noted that in various embodiments, some of the operations shown in FIG. 10 may be implemented in a different order than that shown in the figure, or may be performed in parallel rather than sequentially. Additionally, some of the operations shown in FIG. 10 may not be required in one or more implementations.

Use Cases

The techniques described above, of utilizing traffic processing agents, established and managed by a traffic management service, for performing various types of client-specified tasks on traffic between constituent services of a distributed application may be beneficial in a variety of scenarios. More and more complex applications are being designed and implemented in accordance with the tenets of service-oriented architecture. Such applications may comprise a plurality of interacting constituent services, with the constituent services often being developed by respective teams of engineers and deployed using separate sets of resources, often configured within distinct isolated networks. The described approach may allow a wide variety of traffic processing operations, from load balancing to tracing to conditional routing, to be performed under the covers, without requiring the application owners or administrators to dedicate resources for such processing, and without requiring the application owners or administrators to perform low-level networking configuration to enable traffic to flow across network boundaries.

Illustrative Computer System

Figure 11:
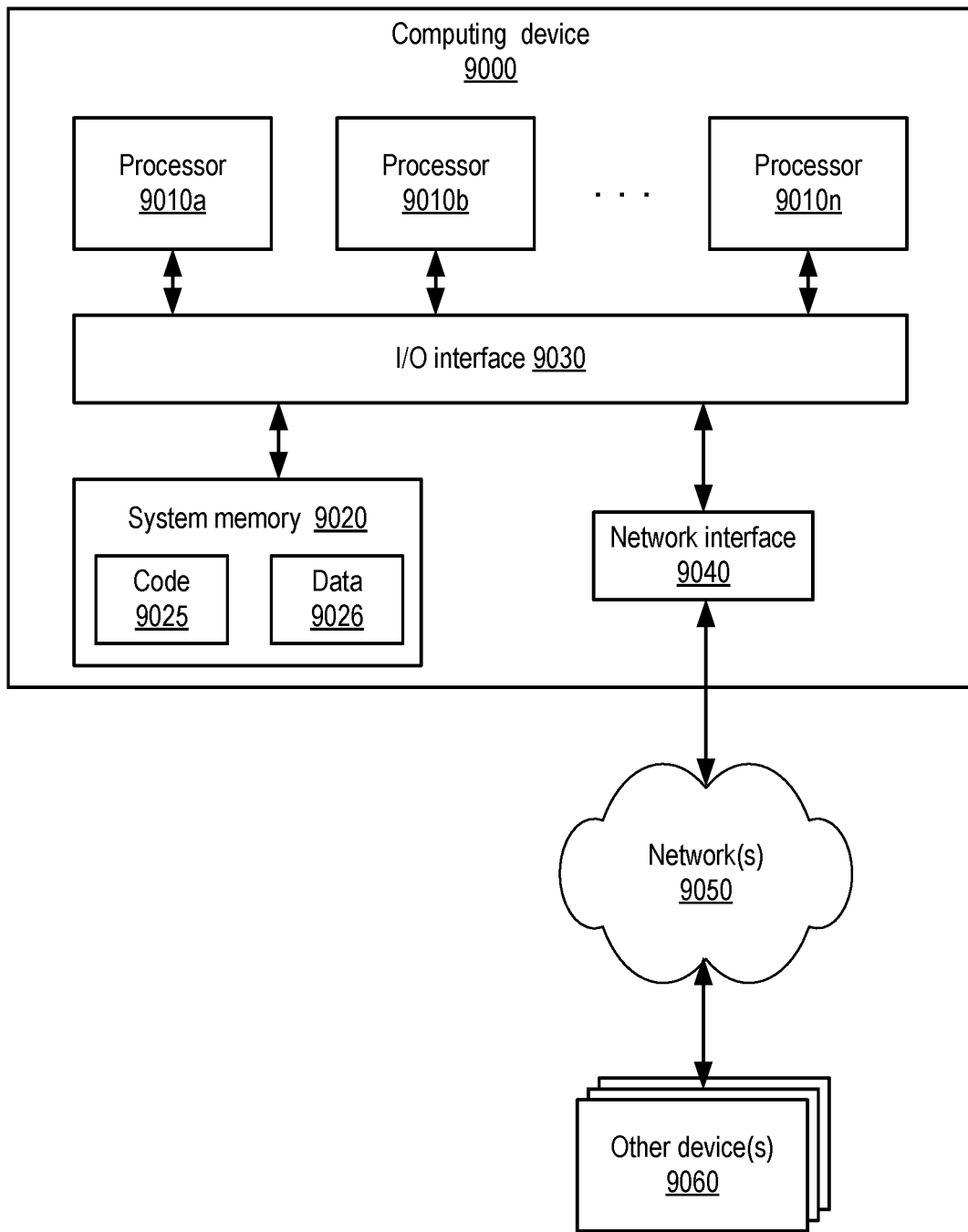
FIG. 11 is a block diagram illustrating an example computing device that may be used in at least some embodiments.

In at least some embodiments, a server that implements one or more of the control-plane and data-plane components of a traffic management service of the kind described herein, as well as components of other services of a provider network, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG.

1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
obtain, via one or more programmatic interfaces, an indication from a client of a traffic management service that (a) a first constituent service of a distributed application is implemented at least in part using a first resource at a first isolated network, (b) a second constituent service of the distributed application is implemented at least in part using a second resource at a second isolated network that is isolated from the first isolated network and (c) the client has opted in to the use of the traffic management service as an intermediary for traffic flowing between at least the first and second constituent services;
obtain, via the one or more programmatic interfaces, (a) a connectivity descriptor of the distributed application at the traffic management service, indicating that at least some requests originating at the first constituent service are to be processed at the second constituent service and (b) a traffic processing descriptor of the distributed application, indicating one or more tasks to be performed with respect to the requests, including at least a tracing task;
identify, at the traffic management service, at least a first hidden multi-tenant traffic processing agent of a fleet of agents of the traffic management service to be used as an intermediary to route traffic from one of the first and second constituent services to another one of the two constituent services;
cause, by the traffic management service, one or more networking configuration settings associated with the first resource to be set such that a request generated at the first resource at the first isolated network and targeted at the second constituent service at the second isolated network is instead directed to the first hidden multi-tenant traffic processing agent rather than the second constituent service, without providing an indication of the first hidden multi-tenant traffic processing agent to the client;
cause, by the first hidden multi-tenant traffic processing agent, in response to receiving a particular request generated at the first resource, one or more trace messages to be stored in accordance with the traffic processing descriptor;
cause, by the first hidden multi-tenant traffic processing agent, one or more packets corresponding to the particular request to be delivered to the second resource, wherein the one or more packets are delivered without requiring the client to configure a network route between the first and second isolated networks.

2. The system as recited in claim 1, wherein the one or more computing devices include further instructions that upon execution on or across the one or more processors further cause the one or more computing devices to:

obtain, at the traffic management service, virtual-to-physical resource mappings of a virtualized computing service; and utilize, by the first hidden multi-tenant traffic processing agent, at least a portion of the virtual-to-physical mappings to cause the one or more packets to be delivered.

3. The system as recited in claim 1, wherein the first hidden multi-tenant traffic processing agent is implemented using one or more of: (a) a compute instance of a virtualized computing service, (b) a virtualization management offloading card of a virtualization server, (c) a virtualization management software component running on a CPU of a virtualization server, or (d) a non-virtualized server.

4. The system as recited in claim 1, wherein the one or more computing devices include further instructions that upon execution on or across the one or more processors further cause the one or more computing devices to:

decrypt, at the first hidden multi-tenant traffic processing agent, at least a portion of contents of the particular request; and encrypt, at the first hidden multi-tenant traffic processing agent, at least a portion of contents of the one or more packets before delivery to the second resource.

5. The system as recited in claim 1, wherein the one or more computing devices include further instructions that upon execution on or across the one or more processors cause the one or more computing devices to:

verify, at the traffic management service, prior to causing the one or more packets to be delivered, that a permission setting associated with the second constituent service allows delivery of packets on behalf of the first constituent service.

6. A method, comprising:

performing, at one or more computing devices:

obtaining, via one or more programmatic interfaces, an indication that at least some requests originating at a first constituent service of a first application are to be processed at a second constituent service of the first application, wherein the first constituent service is implemented at least in part at a first resource in a first network, and wherein the second constituent service is implemented at least in part at a second resource in a second network isolated from the first network;

identifying at least a first hidden traffic processing agent of a traffic management service to be used as an intermediary to route network traffic flowing from one of the first and second constituent services to another one of the two constituent services;

storing one or more networking configuration settings associated with the first resource, such that a request generated at the first resource at the first network and targeted at the second constituent service at the second network is instead directed to the first hidden traffic processing rather than the second constituent service; and causing, by the first hidden traffic processing agent, one or more packets corresponding to a particular request generated at the first resource to be delivered to the second resource.

7. The method as recited in claim 6, further comprising performing, at the one or more computing devices:

obtaining, via the one or more programmatic interfaces, an indication that one or more tasks are to be performed with respect to requests originating at the first constituent service, including one or more of: (a) a load balancing task, (b) an authorization-related task, (c) an authentication-related task, (d) an affinity-based destination selection task, (e) a logging task, (f) a load shedding-related task, (g) a health evaluation task, or (h) a back pressure-related task; and implementing, at the first hidden traffic processing agent, the one or more tasks with respect to at least one request originating at the first resource.

8. The method as recited in claim 6, further comprising performing, at the one or more computing devices:

obtaining, at the traffic management service, virtual-to-physical resource mappings of a virtualized computing service; and utilizing, by the first hidden traffic processing agent, at least a portion of the virtual-to-physical mappings to cause the one or more packets to be delivered.

9. The method as recited in claim 6, further comprising performing, at the one or more computing devices:

storing metadata at the traffic management service, indicating that the first hidden traffic processing agent is to be configured in single-tenant mode, such that requests associated with a second application are not transmitted to the first hidden traffic processing agent.

10. The method as recited in claim 6, further comprising performing, at the one or more computing devices:

establishing a plurality of hidden traffic processing agents by the traffic management service prior to receiving the connectivity descriptor of the first application, wherein identifying the first hidden traffic processing agent comprises selecting the first hidden traffic agent from the plurality of hidden traffic processing agents.

11. The method as recited in claim 6, wherein the first hidden traffic processing agent is implemented using one or more of: (a) a compute instance of a virtualized computing service, (b) a virtualization management offloading card of a virtualization server, (c) a virtualization management software component running on a CPU of a virtualization server, or (d) a non-virtualized server.

12. The method as recited in claim 6, wherein the traffic management service is implemented at least in part at one or more data centers of a provider network, and wherein at least one resource of the first and second resources comprises at least a portion of one or more of: (a) a compute instance of a virtualized computing service of the provider network, (b) a resource of a software-container-based computing service of the provider network, (c) a resource of a dynamically-provisioned event-driven computing service of the provider network, (d) an auto-scaling group of compute resources of the provider network, (e) a destination of a load balancer of the provider network, or (f) a computing device located at a premise of a client of the provider network.

13. The method as recited in claim 6, wherein the one or more networking configuration settings include a record associating a domain name of one or more constituent services of the first application with a network address of an endpoint of the traffic management service.

14. The method as recited in claim 6, further comprising performing, at the one or more computing devices:

parsing, at the first hidden traffic processing agent, at least a portion of the particular request in accordance with a request message format indicated to the traffic management service via a programmatic interface.

15. The method as recited in claim 6, further comprising performing, at the one or more computing devices:

decrypting, at the first hidden traffic processing agent, at least a portion of contents of the particular request; and causing at least a portion of contents of the one or more packets to be encrypted before delivery to the second resource.

16. One or more non-transitory computer-accessible storage media storing program instructions that when executed on or across one or more processors cause one or more computer systems to:
   determine that one or more messages originating at a first constituent service of a first application are to be processed at a second constituent service of the first application, wherein the first constituent service is implemented at least in part at a first resource in a first network, and wherein the second constituent service is implemented at least in part at a second resource in a second network isolated from the first network;
   generate one or more networking configuration settings associated with the first resource, such that a message originating at the first resource at the first network and targeted at the second constituent service at the second network is instead directed to, rather than the second constituent service, a traffic processing agent established by a traffic management service that is used as an intermediary to route traffic from one of the first and second constituent services to another one of the two constituent services; and
   cause, in response to a receipt of a first message at the traffic processing agent from the first resource, one or more packets corresponding to the first message to be delivered to the second resource.

17. The one or more non-transitory computer-accessible storage media as recited in claim 16, storing further program instructions that when executed on or across the one or more processors cause the one or more computer systems to:
   generate one or more additional networking configuration settings associated with a third resource of a third constituent service of a second application, such that a request originating at the third resource is directed to the traffic processing agent; and
   cause, in response to a receipt of a second message at the traffic processing agent, wherein the second message originates at the third resource, one or more packets corresponding to the second message to be delivered to a different constituent service of the second application.

18. The one or more non-transitory computer-accessible storage media as recited in claim 16, storing further program instructions that when executed on or across the one or more processors cause the one or more computer systems to:
   dynamically instantiating the traffic processing agent subsequent to obtaining the connectivity descriptor.

19. The one or more non-transitory computer-accessible storage media as recited in claim 16, storing further program instructions that when executed on or across the one or more processors cause the one or more computer systems to:
   transmit, to the traffic processing agent, an indication of conditional routing to be implemented for messages originating at the first resource, wherein in accordance with the conditional routing indication, a first fraction of messages originating at the first constituent service is to be routed to a second fraction of destination resources at the second constituent service; and
   cause the traffic processing agent to select a destination for the one or more packets based at least in part on the indication of conditional routing.

20. The one or more non-transitory computer-accessible storage media as recited in claim 16, storing further program instructions that when executed on or across the one or more processors cause the one or more computer systems to:
   drop, by the traffic processing agent, one or more messages originating at the first resource in accordance with a traffic processing request directed to the traffic processing service.

* * * * *